US010121445B2

(12) United States Patent
Gass et al.

(10) Patent No.: US 10,121,445 B2
(45) Date of Patent: Nov. 6, 2018

(54) ACTIVE MATRIX DISPLAY DEVICE AND METHOD OF DRIVING SAME

(71) Applicant: Sharp Kabushiki Kaisha, Osaka (JP)

(72) Inventors: Paul Antony Gass, Oxford (GB); Benjamin John Broughton, Oxford (GB); Emma Jayne Walton, Oxford (GB); Christopher James Brown, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 82 days.

(21) Appl. No.: 14/899,356

(22) PCT Filed: Jul. 25, 2014

(86) PCT No.: PCT/JP2014/003937
§ 371 (c)(1),
(2) Date: Dec. 17, 2015

(87) PCT Pub. No.: WO2015/011933
PCT Pub. Date: Jan. 29, 2015

(65) Prior Publication Data
US 2016/0155407 A1 Jun. 2, 2016

(30) Foreign Application Priority Data
Jul. 26, 2013 (GB) .................................. 1313404.4

(51) Int. Cl.
*G09G 3/36* (2006.01)
*G02F 1/1362* (2006.01)

(52) U.S. Cl.
CPC ......... *G09G 3/3696* (2013.01); *G09G 3/3607* (2013.01); *G09G 3/3648* (2013.01);
(Continued)

(58) Field of Classification Search
CPC ... G02F 2001/134345; G02F 1/136213; G02F 1/13624; G02F 1/1362; G02F 2201/52;
(Continued)

(56) References Cited

U.S. PATENT DOCUMENTS 4,973,135 A    11/1990 Okada et al.
5,767,836 A *  6/1998 Scheffer ............... G09G 3/2011
                                                345/690

(Continued)

FOREIGN PATENT DOCUMENTS

WO    WO 01/24153 A1    4/2001
WO    WO 2009/110128 A1 9/2009

(Continued)

OTHER PUBLICATIONS

International Search Report for corresponding International Application No. PCT/JP2014/03937 dated Sep. 16, 2014.

(Continued)

Primary Examiner — Sanjiv D Patel
(74) Attorney, Agent, or Firm — Renner, Otto, Boisselle & Sklar, LLP

(57) ABSTRACT

An active matrix LCD display of the multi-pixel drive (MPD) type, in which a pixel comprises a plurality of sub-pixels with each sub-pixel of a pixel being associated with a respective storage capacitor address lines so that the voltage applied across an individual sub-pixel depends on both the signal voltage and the voltage applied to the associated storage capacitor address line, is driven such that the relationship between at least a first one of the capacitor line voltages and a second one of the capacitor line in a first display refresh period of the frame is different to the relationship between the first of the capacitor line voltages and the second of the capacitor line voltages in a second display refresh period of the frame. This allows the root- (Continued)

mean-square (RMS) voltage applied over the frame across a first of the sub-pixels to be controlled at least partially independently of the RMS voltage applied over the frame across a second of the sub-pixels, thereby providing increased resolution.

19 Claims, 18 Drawing Sheets

(52) U.S. Cl.
CPC .... *G02F 1/13624* (2013.01); *G02F 1/136213* (2013.01); *G02F 2201/52* (2013.01); *G09G 2300/0452* (2013.01); *G09G 2300/0876* (2013.01); *G09G 2310/0235* (2013.01)

(58) Field of Classification Search
CPC ..... G09G 2300/0876; G09G 2320/028; G09G 2300/0443; G09G 3/3614; G09G 2310/0235; G09G 2300/0452; G09G 3/3607; G09G 2340/0457; G09G 3/2003; G09G 3/2074; G06F 2300/0876
See application file for complete search history.

(56) References Cited

U.S. PATENT DOCUMENTS

| | | | | |
|---|---|---|---|---|
| 6,046,716 | A * | 4/2000 | McKnight | G09G 3/2011 345/208 |
| 7,079,214 | B2 * | 7/2006 | Shimoshikiryo | G02F 1/134336 349/129 |
| 7,446,785 | B1 * | 11/2008 | Hewlett | G09G 3/2033 345/691 |
| 2005/0122441 | A1 * | 6/2005 | Shimoshikiryoh | G02F 1/13624 349/38 |
| 2008/0030660 | A1 * | 2/2008 | Roth | G09G 3/3607 349/106 |
| 2010/0097366 | A1 * | 4/2010 | Kitayama | G09G 3/3614 345/213 |
| 2010/0238203 | A1 * | 9/2010 | Stroemer | G09G 3/3611 345/690 |
| 2010/0302131 | A1 * | 12/2010 | Tsubata | G02F 1/136213 345/87 |
| 2012/0086743 | A1 * | 4/2012 | Shiomi | G02F 1/136213 345/694 |
| 2015/0192826 | A1 * | 7/2015 | Lin | G02F 1/133514 359/891 |

FOREIGN PATENT DOCUMENTS

WO WO 2011/034209 A1 3/2011
WO WO 2011/118423 A1 9/2011

OTHER PUBLICATIONS

Form PCT/ISA/237 for corresponding International Application No. PCT/JP2014/03937 dated Sep. 16, 2014.
Yoshida et al., "The luminance resolution characteristics of multi-primary-color display", Journal of the Society for Information Display, 19, 11, pp. 771-780, 2011.
T.J Scheffer et al., "Active Addressing™ of STN displays for high-performance video applications", Displays, vol. 14, No. 2, pp. 74-85, 1993.
Alt and Pleshko, "Scanning Limitations of Liquid-Crystal Displays", IEEE Transactions on Electron Devices. vol. ED-21, pp. 146-155. 1974.
Nehring and Kmetz, "Ultimate Limits for Matrix Addressing of RMS-Responding Liquid-Crystal Displays", IEEE Transactions on Electron Devices. vol. ED-26, pp. 795-802. 1979.
Ernst Lueder, *Liquid Crystal Displays*, Wiley and Sons Ltd, p. 239, 2001.

* cited by examiner

Figure 12

| Pixel Region A Image Data | Pixel Region B Image Data | V₁ | V₂ | VpixA rms / dc | VpixB rms / dc | V₁' | V₂' | VpixA rms/dc | VpixB rms/dc |
|---|---|---|---|---|---|---|---|---|---|
| 0 | 0 | -1.5 V | -1.5 V | 1.5 V / 0 V | 1.5 V / 0 V | -1.5 V | -1.5 V | 1.5 V / 0 V | 1.5 V / 0 V |
| 0 | 255 | -4.5V | +1.5V | 1.5 V / 0 V | 4.5 V / 0 V | -4.5V | +1.5V | 1.5 V / 0 V | 4.5 V / 0 V |
| 255 | 0 | +1.5V | -4.5V | 4.5 V / 0 V | 1.5 V / 0 V | +1.5V | -4.5V | 4.5 V / 0 V | 1.5 V / 0 V |
| 255 | 255 | +2.74V | +2.74V | 4.5 V / 4.24 V | 4.5 V / 4.24 V | -5.74V | -5.74V | 4.5 V / -4.24 V | 4.5 V / -4.24 V |

Figure 14

| Pixel Region A Image Data | Pixel Region B Image Data | Odd/Even Column | DC polarity | $V_1$ | $V_2$ | $V_3$ | $V_4$ | VpixA rms | VpixB rms | VpixA dc | VpixB dc |
|---|---|---|---|---|---|---|---|---|---|---|---|
| 0 | 0 | Odd | + | 0V | 0V | 0V | 0V | 1.5 V | 1.5 V | 0 | 0 |
| 0 | 0 | Odd | - | 0V | 0V | 0V | 0V | 1.5 V | 1.5 V | 0 | 0 |
| 0 | 0 | Even | + | 0V | 0V | 0V | 0V | 1.5 V | 1.5 V | 0 | 0 |
| 0 | 0 | Even | - | 0V | 0V | 0V | 0V | 1.5 V | 1.5 V | 0 | 0 |
| 0 | 255 | Odd | + | 0V | 0V | +3V | -3V | 1.5 V | 3.35 V | 0 | 0 |
| 0 | 255 | Odd | - | 0V | 0V | +3V | -3V | 1.5 V | 3.35 V | 0 | 0 |
| 0 | 255 | Even | + | -3V | +3V | 0 | 0 | 1.5 V | 3.35 V | 0 | 0 |
| 0 | 255 | Even | - | -3V | +3V | 0 | 0 | 1.5 V | 3.35 V | 0 | 0 |
| 255 | 0 | Odd | + | +3V | -3V | 0 | 0 | 3.35V | 1.5 V | 0 | 0 |
| 255 | 0 | Odd | - | +3V | -3V | 0 | 0 | 3.35V | 1.5 V | 0 | 0 |
| 255 | 0 | Even | + | 0 | 0 | -3V | +3V | 3.35V | 1.5 V | 0 | 0 |
| 255 | 0 | Even | - | 0 | 0 | -3V | +3V | 3.35V | 1.5 V | 0 | 0 |
| 255 | 255 | Odd | + | +3V | -3V | +3V | -3V | 3.35V | 3.35V | 0 | 0 |
| 255 | 255 | Odd | - | +3V | -3V | +3V | -3V | 3.35V | 3.35V | 0 | 0 |
| 255 | 255 | Even | + | -3V | +3V | -3V | +3V | 3.35V | 3.35V | 0 | 0 |
| 255 | 255 | Even | - | -3V | +3V | -3V | +3V | 3.35V | 3.35V | 0 | 0 |

Figure 15

| Pixel Region A Image Data | Pixel Region B Image Data | Odd/Even Column | DC polarity | $V_1$ | $V_2$ | $V_3$ | $V_4$ | VpixA rms | VpixB rms | VpixA dc | VpixB dc |
|---|---|---|---|---|---|---|---|---|---|---|---|
| 0 | 128 | Odd | + | +0.9 V | -0.25 V | +1.6 V | -1.9 V | 1.5 V | 2.4 V | +0.088 V | +0.088 V |
| 0 | 128 | Odd | - | +0.25 V | -0.9 V | +1.9 V | -1.6 V | 1.5 V | 2.4 V | -0.088 V | -0.088 V |
| 0 | 128 | Even | + | -1.9 V | +1.6 V | -0.25 V | +0.9 V | 1.5 V | 2.4 V | +0.088 V | +0.088 V |
| 0 | 128 | Even | - | -1.6 V | +1.9 V | -0.9 V | +0.25 V | 1.5 V | 2.4 V | -0.088 V | -0.088 V |
| 128 | 0 | Odd | + | +1.9 V | -1.6 V | +0.9 V | -0.25 V | 2.4 V | 1.5 V | +0.238 V | +0.238 V |
| 128 | 0 | Odd | - | +1.6 V | -1.9 V | +0.25 V | -0.9 V | 2.4 V | 1.5 V | -0.238 V | -0.238 V |
| 128 | 0 | Even | + | -0.25 V | +0.9 V | -1.6 V | +1.9 V | 2.4 V | 1.5 V | +0.238 V | +0.238 V |
| 128 | 0 | Even | - | -0.9 V | +0.25 V | -1.9 V | +1.6 V | 2.4 V | 1.5 V | -0.238 V | -0.238 V |
| 128 | 128 | Odd | + | +3 V | 0 V | 1 V | -2 V | 2.4 V | 2.4 V | +0.5 V | +0.5 V |
| 128 | 128 | Odd | - | 0 V | -3 V | 2 V | -1 V | 2.4 V | 2.4 V | -0.5 V | -0.5 V |
| 128 | 128 | Even | + | -2 V | +1 V | 0 V | +3 V | 2.4 V | 2.4 V | +0.5 V | +0.5 V |
| 128 | 128 | Even | - | -1 V | +2 V | -3 V | 0 V | 2.4 V | 2.4 V | -0.5 V | -0.5 V |

ACTIVE MATRIX DISPLAY DEVICE AND METHOD OF DRIVING SAME

TECHNICAL FIELD

The invention relates to a display device and, more particularly, an LCD display of the multi-pixel drive (MPD) type. Further, the invention relates to a method of driving such a display device.

BACKGROUND ART

In an active matrix liquid crystal display (LCD), an image is produced by controlling the light transmittance of a two-dimensional array of discrete image elements (pixels), via the conversion of digital image data, consisting of a data value for each pixel of the image, into analogue voltages with values dependent on that data, and direction of those voltages to each pixel electrode in the array via an active matrix of source data lines, gate lines and thin film transistor (TFT) switching elements. This type of arrangement is illustrated in FIG. 1 (from Ernst Lueder, Liquid Crystal Displays, Wiley and Sons Ltd, 2001, and more fully described in that publication). In such an arrangement each pixel may be defined as each separate electrode area in which is addressable via the active matrix with a single data voltage in each display refresh period. Commonly in such displays, a pixel is provided at each intersection of the source and gate lines, and is electrically connected to these lines by a TFT, such that it may be addressed by the application of a gate voltage pulse via the gate line to the gate terminal of the TFT, and during the period of the gate pulse being present, a data voltage via the source line to the source or drain terminal of the TFT. The pixel electrode is connected to the remaining source or drain terminal of the TFT, and may therefore be charged to the data voltage supplied by the source line during the gate selection pulse, but may remain unaffected by previous or subsequent voltages supplied by the source line when the gate voltage pulse is not present. The resolution of such a display is the number of independently controllable image elements, and is determined by the number of intersections between the source and gate lines. In a colour display, there are typically three colour sub-pixels per composite white pixel (one each of red, green and blue type), and each of these needs to be independently controllable in order for each pixel to be able to display any colour or luminance within the display's gamut, so for a colour display a resolution given as m rows by n columns, the number of source and gate intersections is m×n×3. For the purposes of this disclosure we will consider a pixel to be any electrode region corresponding to a source-gate intersection.

In large area (>10" diagonal) LCDs for applications such as TVs and signage, especially those employing a vertically aligned nematic (VAN) liquid crystal (LC) mode, it is common for each pixel of the display, to be provided with two separate pixel electrode regions, each region being driven by a separate TFT, although both TFT's being connected to the same source and gate lines, and each region being associated with a separate storage capacitor ($C_S$) line. With this arrangement, although the data voltage ($V_D$) supplied to both pixel regions in each frame period will be the same, the signal applied to each capacitor line is separately controllable to allow a different modification to the voltage on each pixel electrode region to be applied subsequently to the application of the common data voltage and removal of the gate selection pulse. This pixel arrangement is known as capacitively coupled split-pixel driving or multi-pixel driving (MPD) and is illustrated in FIG. 2 (a). The equivalent electronic circuit with voltage references is given in FIG. 2 (b).

The advantage of such an arrangement is that is allows each pixel to produce two regions of differing transmittance despite the application of only a single data voltage. This may allow an improvement in the wide viewing angle performance of the panel, and the design and usage of such a pixel arrangement for such purposes is disclosed in U.S. Pat. No. 7,079,214 (Sharp). A timing diagram showing how the voltages supplied to a pixel arrangement of FIG. 2 may be controlled to provide differing transmittances from the two pixel regions, via capacitive coupling of the voltage change applied to the storage capacitor lines after removal of the gate pulse voltage, onto the pixel electrode, is given in FIG. 3.

One potential limitation of the driving methods described in U.S. Pat. No. 7,079,214 is that, although a different transmittance may be produced by the two pixel regions, their relative transmittance has a fixed relationship. As the two storage capacitor lines are common to all the pixels in a row, any modifications made to the pixel electrode voltages after the application of the data voltage to both regions is made to all pixels in the row. Therefore if region A of one pixel of the row is made brighter than region B, then this is true for all pixels in the row (driven with the same voltage polarity, the relative brightness while still fixed being inverted for pixels driven with the opposite polarity), and the capability of providing different transmittance from the two regions does not provide an increase in display resolution. Neither the degree of difference in brightness between the two regions, nor which region is the brighter can be varied from pixel to pixel, so it is not possible to represent image data at a level of detail finer than the pixel array of the panel.

U.S. Pat. No. 4,973,135 (Canon) discloses a means of displaying image data with resolution greater than the number of source-gate intersections of the active matrix of the display, by providing multiple counter electrodes per pixel electrode region. However, in order for a genuine resolution increase to be provided by this method, it must be used in conjunction with a fast-switching, bistable liquid crystal mode, such as a ferroelectric LC.

WO200124153_A1 (ITL) discloses a similar means of achieving multiple regions of independently controllable brightness from each TFT addressed region of an active matrix panel, again utilising multiple counter electrodes per pixel. However, this method is applied to current driven emissive display types, rather than the voltage controlled transmissive LCD, and diode-like behaviour of each pixel allows the counter electrode voltage to select or de-select corresponding regions of the pixel. Also, in order to achieve a genuine resolution increase, each counter electrode controlled region of the pixel must be driven in a time-sequential pattern, so the resolution increase comes at the expense of overall brightness.

WO2011118423 discloses a means of driving an MPD type LCD of the type of U.S. Pat. No. 7,079,214 in such a manner that the different pixel regions may be prevented from transmitting any light regardless of the data voltage supplied to the pixel electrodes, by controlling the voltage on the storage capacitor lines. Again however, the corresponding pixel regions of all pixels of the row must also be prevented from transmitting, so any resolution increase must again come in the form of time sequential transmission from the different pixel regions, and therefore at the expense of brightness.

US20100097366 A1 (Sharp) discloses a means of driving a display with pixels of the type of U.S. Pat. No. 7,079,214 whereby an ac waveform with multiple voltage levels per video frame input period are supplied, in order to allow the wide view improvement provided by the MPD to be achieved in conjunction with a column polarity inversion dc balancing drive pattern, or block polarity inversion drive pattern. Again however, due to the storage capacitor lines being common to all pixels in a row, no means of changing which of the pixel regions is the brighter for different pixels in the row, and therefore allowing the display of higher resolution image data is described.

CITATION LIST

Patent Literature

PTL 1: U.S. Pat. No. 7,079,214
PTL 2: U.S. Pat. No. 4,973,135
PTL 3: WO 2001/24153
PTL 4: WO 2011/118423
PTL 5: US 2010/0097366
PTL 6: U.S. Pat. No. 5,767,836
PTL 7: WO 2009/110128
PTL 8: WO 2011/034209

Non Patent Literature

NPL 1: Ernst Lueder, Liquid Crystal Displays, Wiley and Sons Ltd, 2001
NPL 2: Nehring and Kmetz, IEEE Transactions on Electron Devices. Vol. ED-26, pp. 795-802. 1979
NPL 3: Alt and Pleshko, IEEE Transactions on Electron Devices. Vol. ED-21, pp. 146-155. 1974
NPL 4: T. J Sheffer et al., "Displays", 14, 2, pp 74-85, 1993
NPL 5: Yoshida et al., "Journal of the Society for Information Display", 19, 11, pp 771-780, 2011

SUMMARY OF INVENTION

A first aspect of the invention provides an active matrix LCD display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines. The display has drive means (drive circuitry) for, in a first mode, in response to input data for a pixel for a frame of image data, supplying a plurality of signal voltages for the frame to the source line of the pixel and supplying a plurality of capacitor line voltages, each of the capacitor line voltages being supplied to a respective storage capacitor address line of the pixel. The drive means is adapted to supply the capacitor line voltages such that the relationship between at least a first one of the capacitor line voltages and a second one of the capacitor line voltages supplied in a first display refresh period of the frame is different to the relationship between the first of the capacitor line voltages and the second of the capacitor line voltages supplied in a subsequent display refresh period of the frame.

In a display of the invention the voltage applied to a source line is not constant over a frame, but may take different values in different display refresh periods of a frame. While this could be considered as supplying a single signal voltage waveform in a frame with the signal voltage waveform having a varying magnitude, for clarity of description this application will refer to two (or more) signal voltages being supplied in a frame, one signal voltage being supplied in each display refresh period.

Supplying the capacitor line voltages such that the relationship between two of the capacitor line voltages varies between one display refresh period of the frame and a successive display refresh period overcomes the limitation described with reference to U.S. Pat. No. 7,079,214 above, that the relative transmittance of the sub-pixels is fixed over a frame, and provides increased resolution.

The term "frame" as used denotes a display period corresponding to a frame of the input image supplied to the display. In a conventional display driven as shown in FIG. 3 the display is refreshed just once in a frame, but in a display of the invention the display is refreshed two or more times in a frame.

In an embodiment in which there are three or more display refresh periods in a frame, it is not necessary for the "first" display refresh period and the "subsequent" display refresh period to be consecutive display refresh periods—the relationship between the first one of the capacitor line voltages and the second one of the capacitor line voltages may stay the same for two consecutive display refresh period of a frame (as shown for example for the second and third display refresh periods in FIG. 13 below).

A second aspect of the invention provides an active matrix LCD display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines. The display has drive means for, in a first mode, in response to input data for a pixel for a frame of image data, supplying a plurality of signal voltages for the frame to the source line of the pixel, and supplying a plurality of capacitor line voltages, each of the capacitor line voltages being supplied to a respective storage capacitor address line of the pixel. The drive means is adapted to supply the signal voltage and the capacitor line voltages such that the root-mean-square (RMS) voltage applied over the frame across a first of the sub-pixels is controllable at least partially independently of the RMS voltage applied over the frame across a second of the sub-pixels.

A third aspect of the invention provides a method of driving an active matrix LCD display, the display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines, the method comprising, in a first mode:

in response to input data for a pixel for a frame of image data, supplying a plurality of signal voltages for the frame to the source line of the pixel and supplying a plurality of capacitor line voltages, each of the capacitor line voltages being supplied to a respective storage capacitor address line of the pixel;

wherein the method comprises supply the capacitor line voltages such that the relationship between at least a first one of the capacitor line voltages and a second one of the capacitor line voltages supplied in a first display refresh period of the frame is different to the relationship between the first of the capacitor line voltages and the second of the capacitor line voltages supplied in a subsequent display refresh period of the frame.

A fourth aspect of the invention provides a method of driving an active matrix LCD display, the display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines, the method comprising, in a first mode: in response to input data for a pixel for a frame of image data, supplying a plurality of signal voltages for the frame to the source line of the pixel and supplying a plurality of capacitor line voltages, each of the capacitor line voltages being supplied to a respective storage capacitor address line of the pixel; wherein the method comprises supplying the signal voltage and the capacitor line voltages such that the root-mean-square (RMS) voltage applied over the frame across a first of the sub-pixels is controllable at least partially independently of the RMS voltage applied over the frame across a second of the sub-pixels.

A method of the invention may provide any feature or combination of features defined above for a display of the first or second aspect.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

Technical Problem

The present invention addresses the problem of providing an improved display, for example an improved LCD display.

Solution to Problem

Supplying the capacitor line voltages such that the relationship between two of the capacitor line voltages varies between one display refresh period of the frame and a successive display refresh period overcomes the limitation described with reference to U.S. Pat. No. 7,079,214 above, that the relative transmittance of the sub-pixels is fixed over a frame, and provides increased resolution.

BRIEF DESCRIPTION OF DRAWINGS

FIG. 12 is an example LUT showing the key signal voltages stored as part of an embodiment of the present invention.

FIG. 14 shows examples of data voltages that may be used in the embodiment of FIG. 13.

FIG. 15 shows examples of data voltages that may be used in the embodiment of FIG. 13.

DESCRIPTION OF EMBODIMENTS

It is therefore desirable to provide an active matrix LCD display, with MPD pixel architecture generally as shown in FIGS. 2(a) and 2(b), and in which the root mean squared voltage applied across each of the two or more regions within a single pixel over a number of display refresh periods, and therefore the brightness produced by each of the regions, is controllable with a degree of independence, thereby increasing the resolution of the LCD panel without any addition or modification to the number of pixels or the electronic components comprising each pixel.

Figure 3:
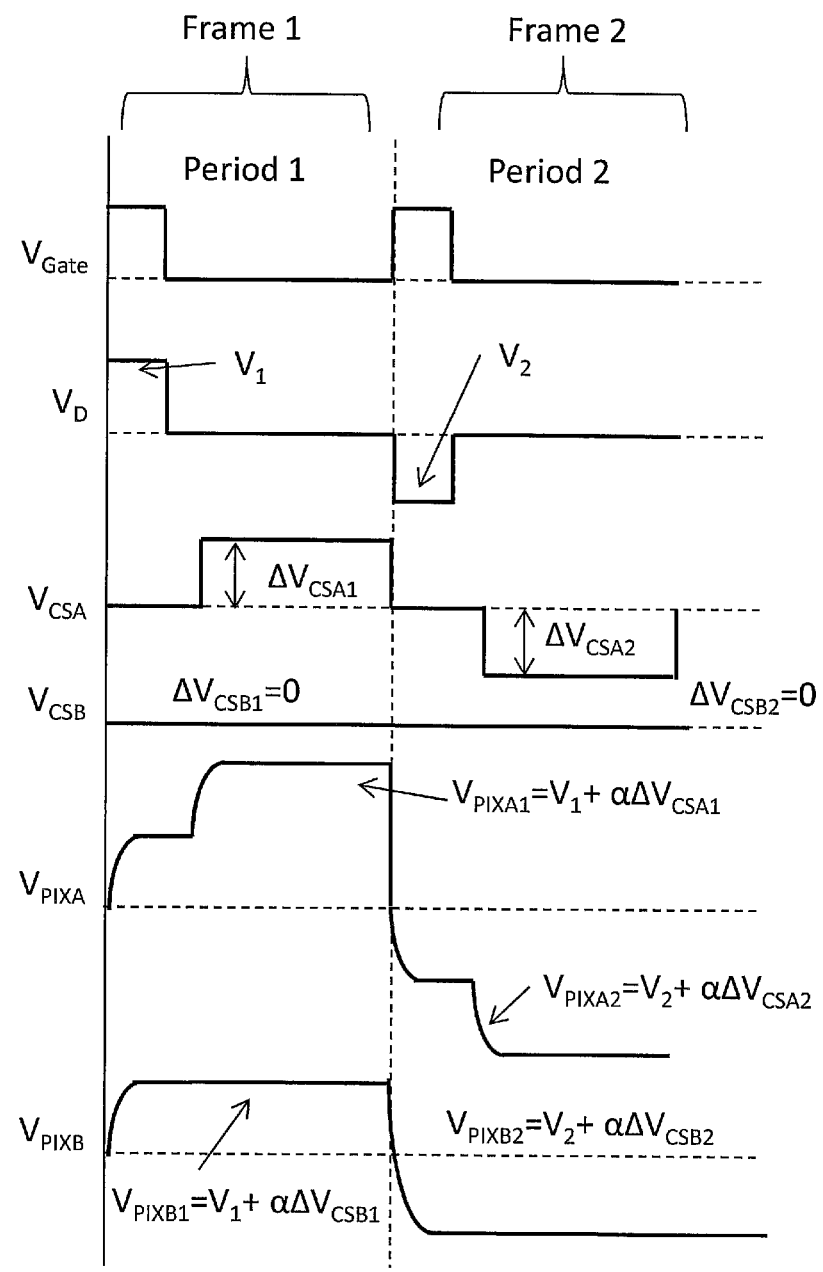
FIG. 3 is a timing diagram of the conventional method of driving a pixel of the type of FIGS. 2(a) and 2(b).
Figure 4:
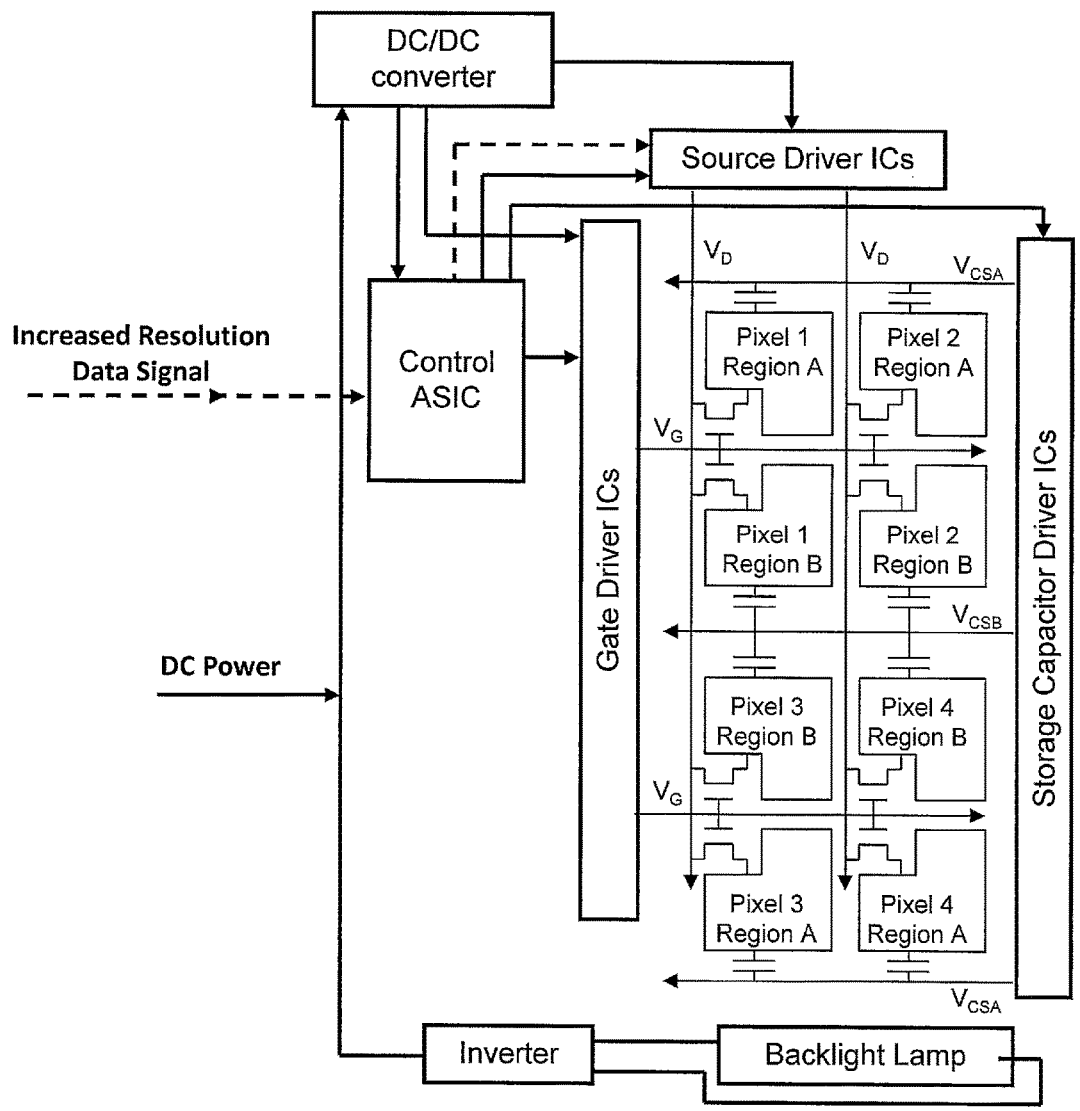
FIG. 4 is a schematic of an LCD control electronics arrangement according to an embodiment of this invention.

In a principal embodiment of this invention an active matrix LCD display, with MPD pixel architecture is provided with control electronics which may consist of a control unit and driver integrated circuits (ICs) as shown in FIG. 4. Each of Pixel 1, Pixel 2 etc. is a single-coloured pixel—the display may comprise groups of pixels of three or more different colours arranged to give composite white pixels, but the invention is not limited to this. As can be seen from the figure, each pixel has two regions (A and B), each associated with a separate storage capacitor address line (hereinafter referred to as just "storage capacitor line" for brevity), and signals are provided to each pixel region via gate driver, source driver and storage capacitor driver ICs. In this principal embodiment, the signals sent to the gate, source and storage capacitor lines differ from those of the conventional art, exemplified in FIG. 3, in that rather than supplying a single data voltage to each pixel and a single shift in each storage capacitor line voltage for each input image video frame, at least two data voltages and two shifts in each storage capacitor line voltage are supplied for each frame, and also in that the storage capacitor line voltages, rather than having a fixed relationship to each other in all display refresh periods, have a different relative voltage in successive sub-frame display refresh periods. These data voltages and storage capacitor line shifts are configured such that the resulting net root-mean-square (rms) voltage on each pixel region over the two or more display refresh periods applied for each frame of input data, corresponds to the voltage across the pixel region required to produce the luminance on each pixel region prescribed by the increased resolution input data. In the condition that the two or more refresh periods occur within a short enough time period that the LC material cannot respond to the instantaneous voltages, it is the rms voltage which then determines the LC response and therefore luminance transmitted by each pixel region. The following explanation describes how such an effect may be achieved.

Figure 1:
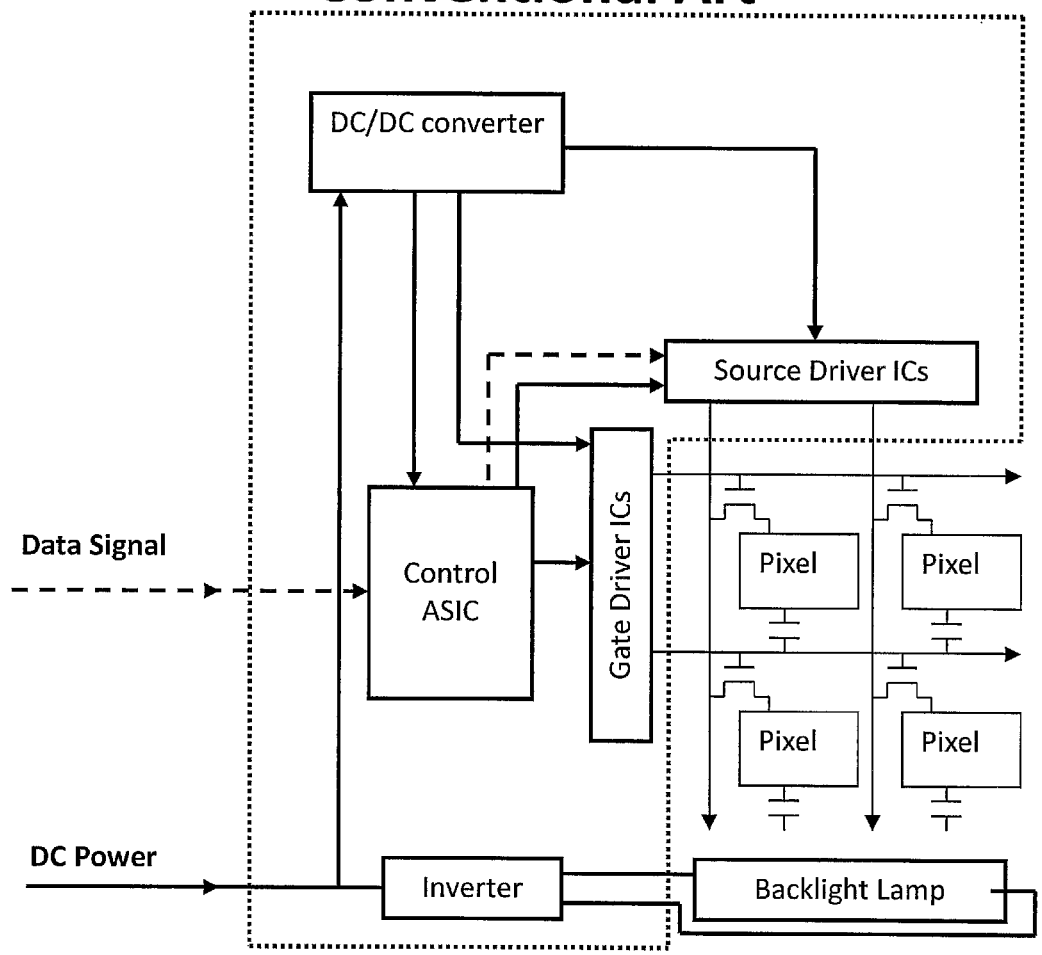
FIG. 1 is a schematic of a standard LCD control electronics arrangement.
Figure 2:
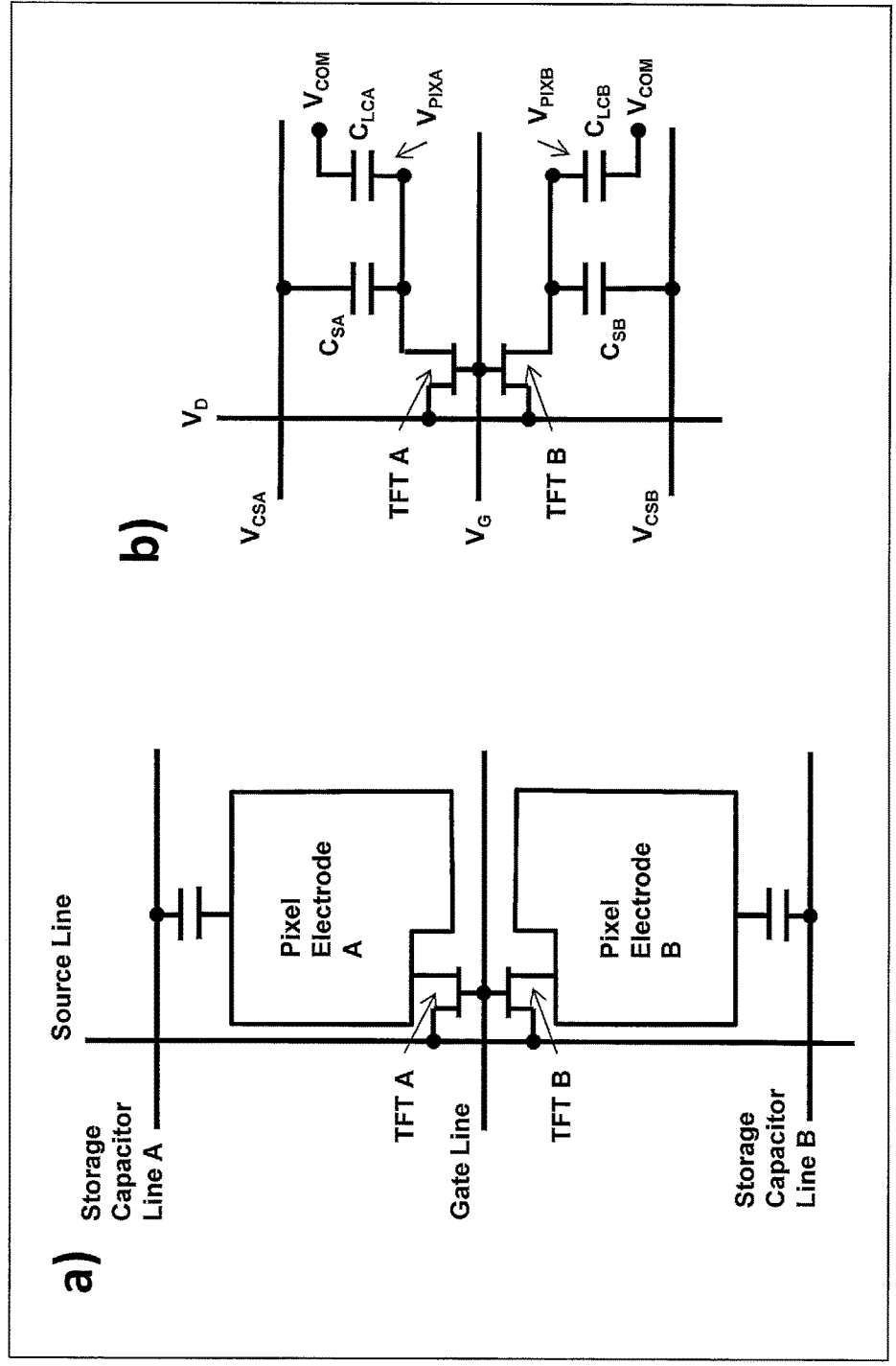
FIG. 2(a) is a schematic of a multi-pixel drive type pixel layout and 2(b) is the equivalent electronic circuit.

In an MPD pixel of the type of FIG. 2, it is the magnitude of the voltage across the liquid crystal layer, between pixel electrodes A and B and the common electrode, i.e. $|V_{PIXA}-V_{COM}|$ and $|V_{PIXB}-V_{COM}|$ which determines the transmission of light through each pixel region at a given time. For simplicity in these descriptions $V_{COM}$ is assumed to be zero at all times, so transmission is determined by $V_{PIXA}$ and $V_{PIXB}$. However the invention is not limited to the case of $V_{COM}=0$, and in a Practical scheme $V_{COM}$ may be non-zero in which case the other voltages may be adjusted correspondingly without altering the effect of the schemes described. In the MPD drive scheme of FIG. 3, during each frame period, gate voltage pulses are applied to each row of the panel sequentially. During the period each row is activated, a data voltage is supplied to each pixel in that row via the source line joining each column in the panel. As the TFTs between the source line and each pixel electrode A and B are made conducting by the gate pulse, the pixel electrodes will charge up to the voltage supplied by the source line ($V_1$). Once the gate voltage is removed from that row, the charge on each pixel region is effectively stored (apart from some leakage across the TFT and the LC layer). Shifts in the storage capacitor line voltage corresponding to either pixel region ($\Delta V_{CSA}$ or $\Delta V_{CSB}$) applied after the gate pulse is removed will then cause a shift ($\alpha\Delta V_{CSA}$ or $\alpha\Delta V_{CSB}$) in the voltage on the corresponding pixel electrode due to capacitive coupling. This voltage shift resulting on the pixel electrode will be some proportion ($\alpha$) of the shift applied to the voltage on the capacitor line, the proportion depending on the relative proportions of the storage capacitance and LC capacitance. For the sake of simplicity in these descriptions this proportion is taken to be unity, but for smaller values of $\alpha$ in practical systems, the magnitude of $\Delta V_{CSA}$ and $\Delta V_{CSB}$ may simply be increased by factor of $1/\alpha$ to produce the same effect.

The resulting voltages across the LC layer are then given by $$V_{PIXA1}=V_1+\alpha\Delta V_{CSA1} \quad\quad \text{Eqn 1(a)}$$

$$V_{PIXA2}=V_2+\alpha\Delta V_{CSA2} \quad\quad \text{Eqn 1(b)}$$

$$V_{PIXB1}=V_1+\alpha\Delta V_{CSB1} \quad\quad \text{Eqn 1(c)}$$

$$V_{PIXB2}=V_2+\alpha\Delta V_{CSB2} \quad\quad \text{Eqn 1(d)}$$

For pixel region A in frame period 1, pixel region A in frame period 2, pixel region B in frame period 1, and pixel region A in frame period 2 respectively. Typically in an LCD display, the time period required to charge the pixel electrodes to the source line voltage and apply the shift to the storage capacitor line is very short relative to the frame time, so the final pixel voltages given in equations 1 (a) to (d) may be taken to be approximately equal to the average voltage experienced by the pixel region for the whole frame time. Under that approximation, the r.m.s voltage applied to each pixel region over two frame periods is given by:

$$V_{rmsPIXA}=\sqrt{\tfrac{1}{2}(V_{PIXA1}^2+V_{PIXA2}^2)} \quad\quad \text{Eqn. 2(a)}$$

$$V_{rmsPIXB}=\sqrt{\tfrac{1}{2}(V_{PIXB1}^2+V_{PIXB2}^2)} \quad\quad \text{Eqn. 2(b)}$$

In the example of the conventional art given in FIG. 3, as the magnitude of $\Delta V_{CSA}$ and $\Delta V_{CSB}$ is the same in both periods, and one period is equal to an image frame, the rms voltage on each pixel region in each frame is simply equal to $V_{PIXA}$ and $V_{PIXB}$, and the total transmission of light through both pixel region is determined solely by the source data voltage, and the relative transmission of each region is determined by the difference in $\Delta V_{CSA}$ and $\Delta V_{CSB}$. In the example of FIG. 3, the voltages applied in frame 2 are equal in magnitude and opposite in polarity to those in frame 1. In this case, the transmission of each pixel region would be the same in both frames, but the voltage applied over the two frames is d.c. balanced. This is typical of LCD drive schemes in order to prevent migration of charged impurities in the LC layer.

Figure 5:
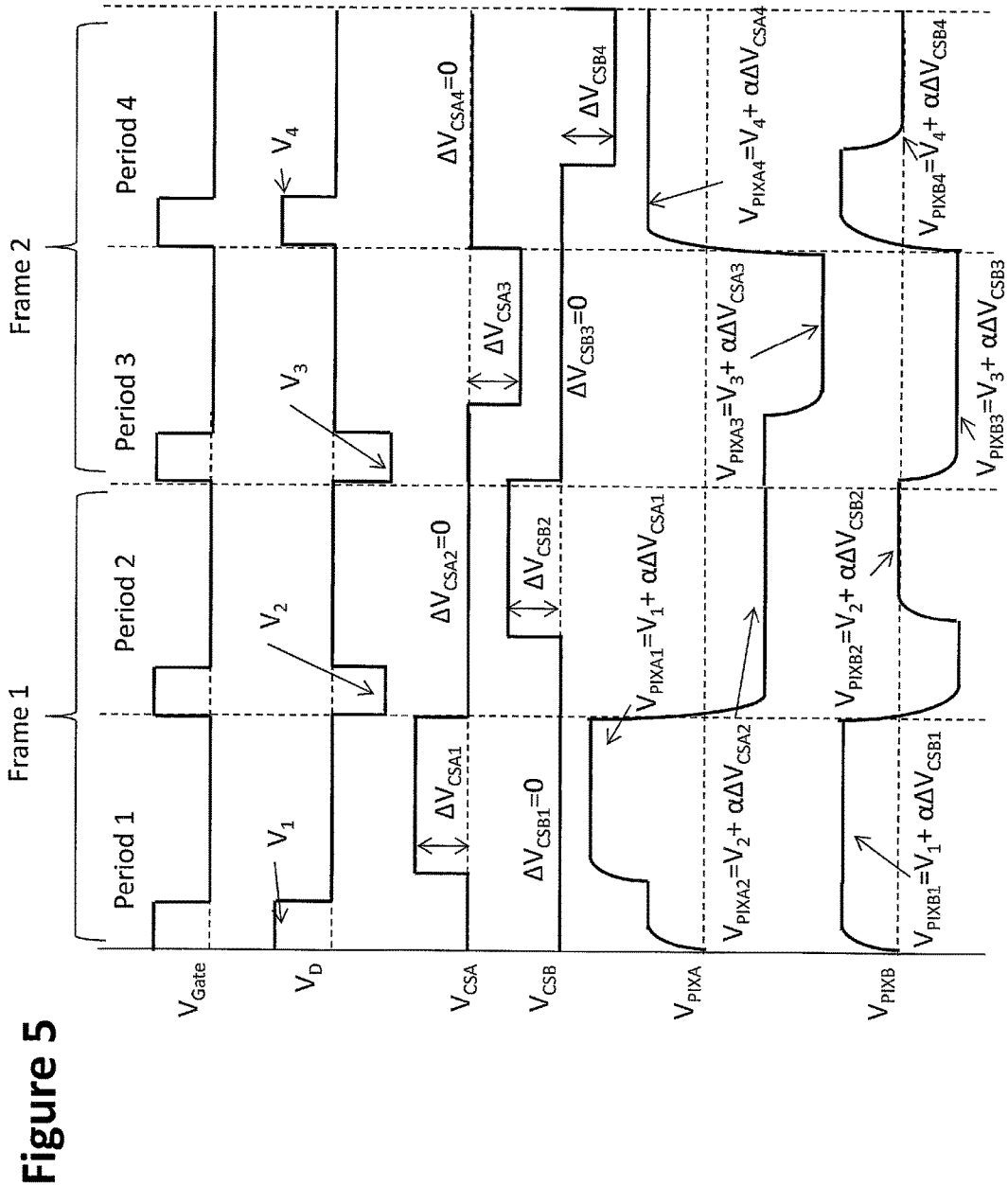
FIG. 5 is a timing diagram illustrating a means of driving a pixel of the type of FIG. 2 according to an embodiment of this invention.

However, in a driving scheme of this embodiment, illustrated in FIG. 5, at least two sub-frame periods are defined per input image frame and the relationship between the $\Delta V_{CSA}$ and $\Delta V_{CSB}$ voltage shifts is varied from one sub-frame period of a frame to another sub-frame period of the frame. (A sub-frame period may also be called a "refresh period", since the pixel is refreshed in each sub-frame period.) In FIG. 5 each of the $\Delta V_{CSA}$ and $\Delta V_{CSB}$ voltage shifts is varied from one sub-frame period of a frame to the other sub-frame period, but in principle it would be sufficient if only one of the $\Delta V_{CSA}$ and $\Delta V_{CSB}$ voltage shifts were to change between two sub-periods as this would still produce a change in relative voltage between the $\Delta V_{CSA}$ and $\Delta V_{CSB}$ voltage shifts. In this case, by configuring the magnitudes and polarities of $V_1$ and $V_2$ in each sub-frame period with the varying storage capacitor line voltage shifts, the rms voltages on each pixel region may be controlled with a degree of independence. This allows the resolution of the display to be increased, compared to the resolution obtained when the display is driven using the conventional drive method of FIG. 3.

Figure 6:
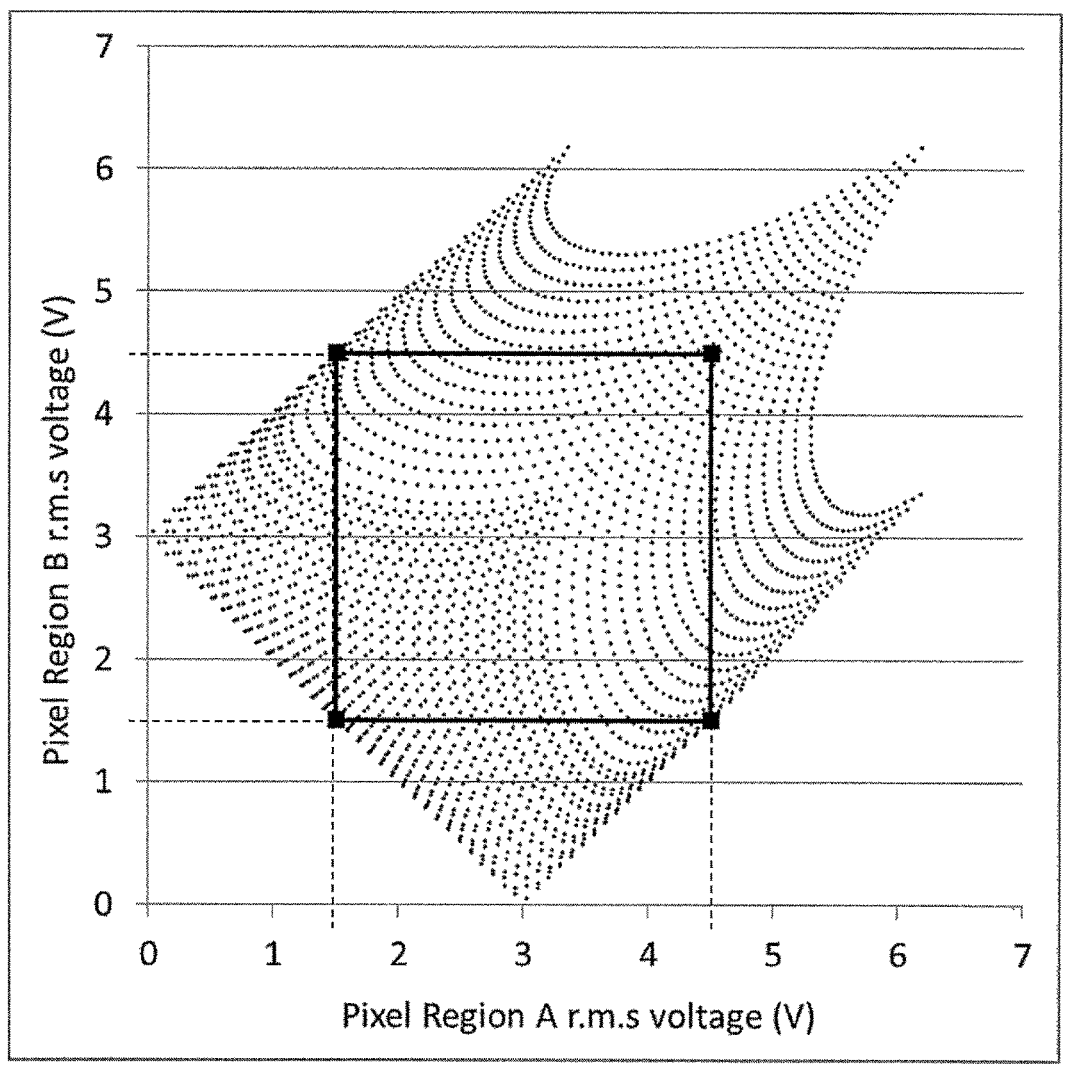
FIG. 6 is a plot showing the range of rms voltages which may be simultaneously achieved on the two pixel region of a pixel of the type shown in FIG. 2 when driven according with signal voltages of the type shown in FIG. 5.

To demonstrate the driving scheme of this embodiment, FIG. 6 shows a plot of the rms voltages resulting on pixel region A and B over two refresh periods, for all combinations of $V_1$ and $V_2$ between −4.5 V and +4.5 V, in steps of 0.18 V, where $\Delta V_{CSA1}=+3$ V, $\Delta V_{CSA2}=0$ V, $\Delta V_{CSB1}=0$ V, and $\Delta V_{CSB2}=+3$ V. It can be seen from the figure that there exists an independent voltage control range (indicated by the black square box) within which the rms voltage on either pixel region may be altered without the need to alter the rms voltage on the other pixel region. For the example drive voltages given, this independent switching range covers the region from 1.5 Vrms to 4.5 Vrms for each pixel region. This gives a selection ratio (maximum independently controllable voltage/minimum independently controllable voltage) of 3. This is the maximum selection ratio achievable for a two row passive matrix addressed display with variable column voltage amplitude (Nehring and Kmetz, IEEE Transactions on Electron Devices. Vol. ED-26, pp. 795-802. 1979), the key difference being that the voltage across the LC layer in the pixel is the sum of the column data voltage and shifted storage capacitor line row voltage, rather than the difference between the column voltage and row voltage in a standard passive matrix display (Alt and Pleshko, IEEE Transactions on Electron Devices. Vol. ED-21, pp. 146-155. 1974).

Figure 7:
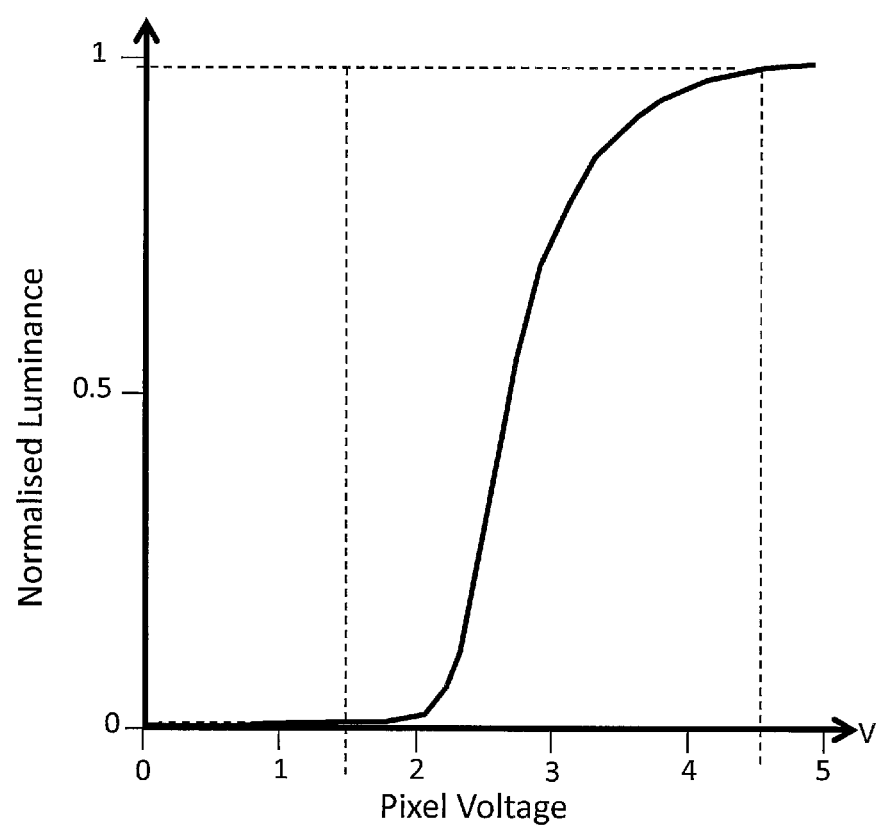
FIG. 7 is a plot showing the luminance produces by a pixel as a function of rms voltage.

FIG. 7 shows the voltage-transmission (V-T) curve of a typical multi-domain vertical alignment (MVA) mode LCD, of the type commonly used in television displays. It can be seen that the independently controllable voltage range achieved by the drive scheme described above will allow independent control of the luminance produced by each pixel region over almost the entire range of the display. It should be noted that while the voltages given in the above example are selected to provide independent luminance control of two pixel regions for a display with a V-T response as in FIG. 7, the scheme is also applicable to LC modes with different responses simply by scaling the drive voltages. The only limitation is the selection ratio, which has a theoretical maximum of 3. It is also apparent that the invention may be applied to any display which switches according to the rms value of the applied voltage. Indeed the LC mode of the display may be selected so as to provide a V-T curve with characteristics, including the threshold voltage, post-threshold gradient and voltage of maximum luminance, which are particularly suited to the driving scheme of this invention.

By way of further clarification of the independent control afforded by the drive scheme of this embodiment, the four example voltage configurations corresponding to the four corners of the independent voltage controllable range will now be explicitly considered.

Figure 8:
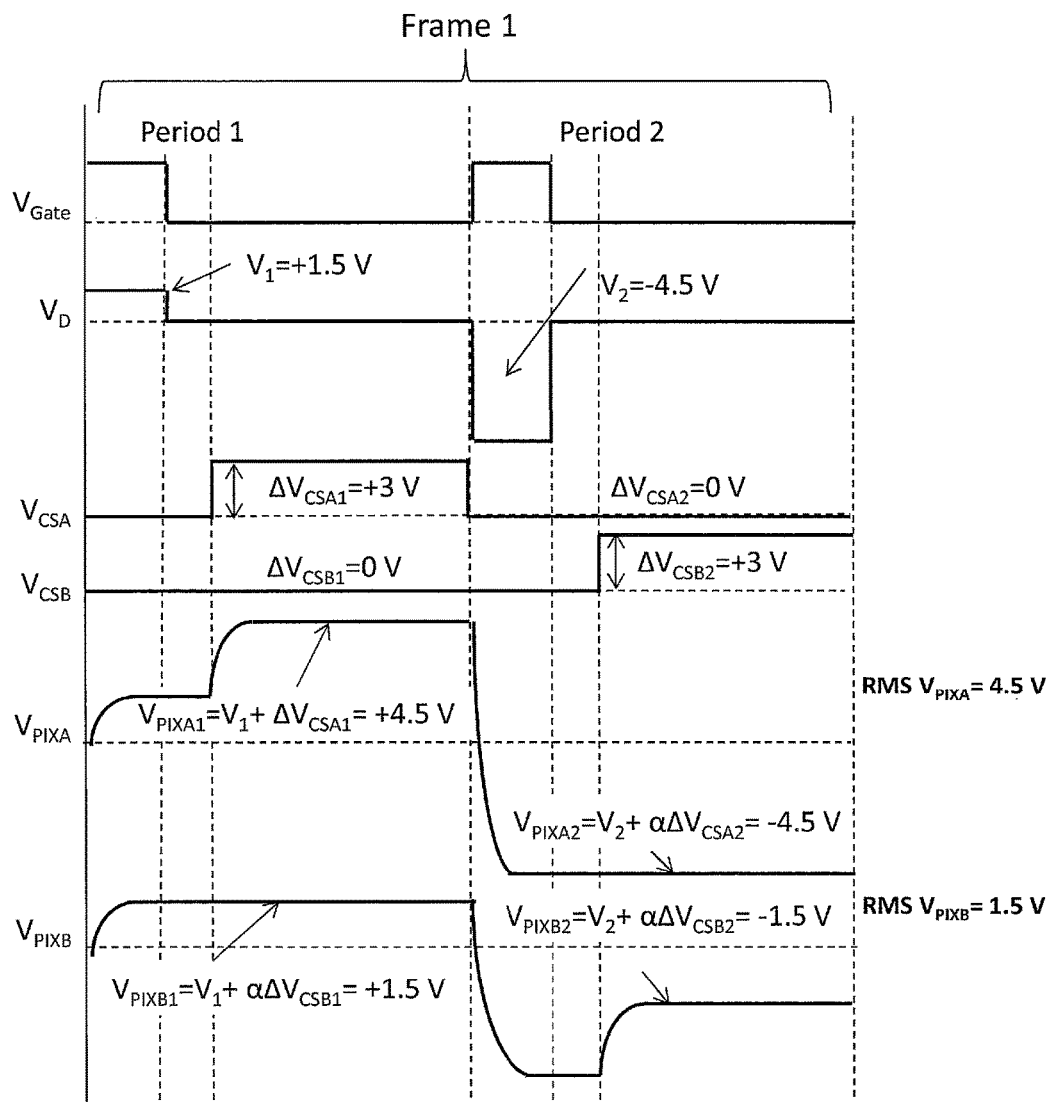
FIG. 8 is a timing diagram illustrating a means of driving a pixel of the type of FIG. 2 according to a further embodiment of this invention.

FIG. 8 illustrates the voltage waveforms on the gate, storage capacitor, and source data lines required to produce an rms voltage on pixel region A of 4.5 $V_{rms}$ and an rms voltage on pixel region B of 1.5 $V_{rms}$. It can be seen from the figure that source data voltages in sub-frame periods 1 and 2 of +1.5 V and −4.5 V, in combination with the above described storage capacitor line voltage shifts of either +3 V or 0 V achieve this, and it can also be seen from FIG. 7 that these rms voltage will produce approximately maximum transmission from pixel region A, and approximately minimum transmission from Pixel region B.

Figure 9:
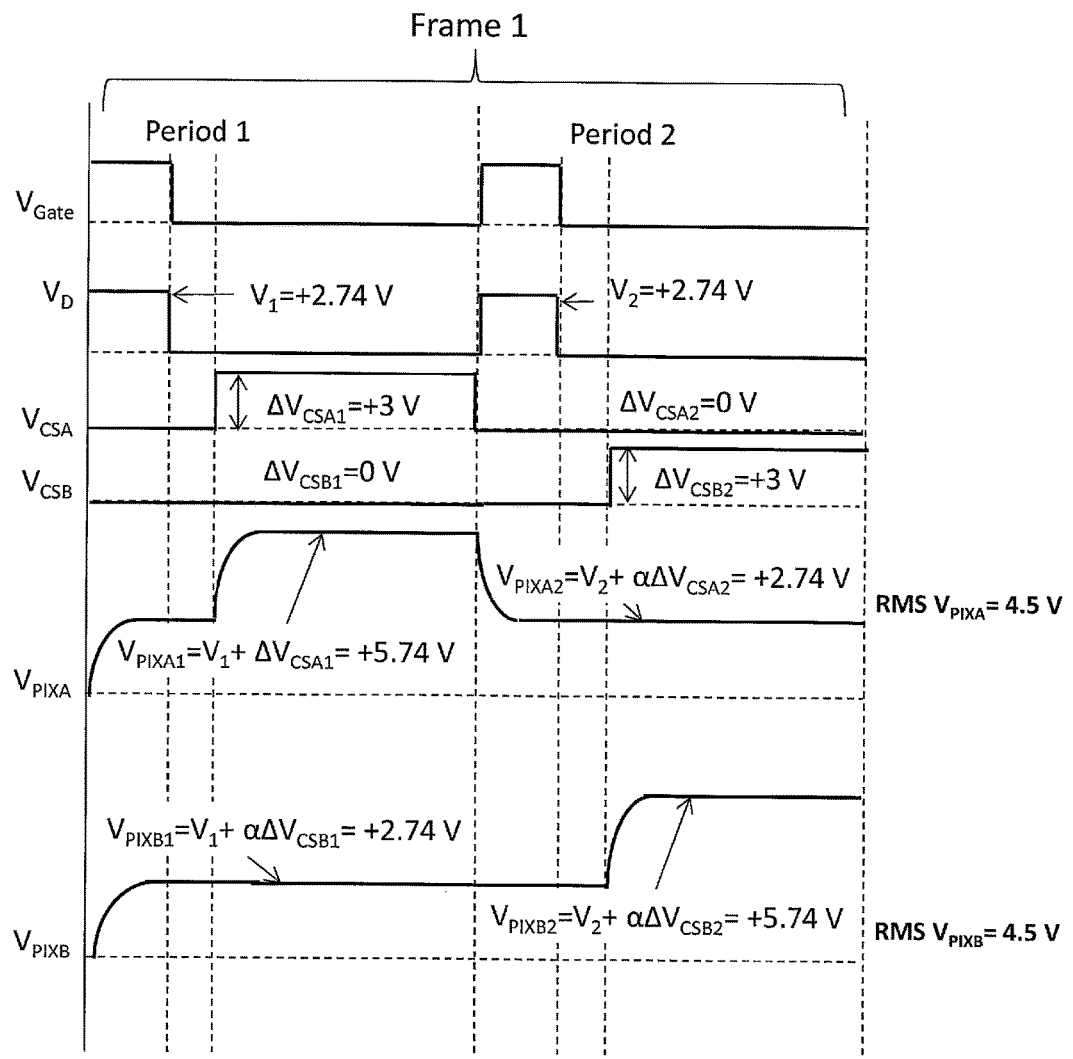
FIG. 9 is a timing diagram illustrating a means of driving a pixel of the type of FIG. 2 according to a further embodiment of this invention.

FIG. 9 illustrates how source data voltages of +2.74 V in both sub-frame periods, with the same storage capacitor line voltage shifts as the previous example, result in an rms voltage on both pixel regions of 4.5 $V_{rms}$, effectively switching both pixel regions on.

Figure 10:
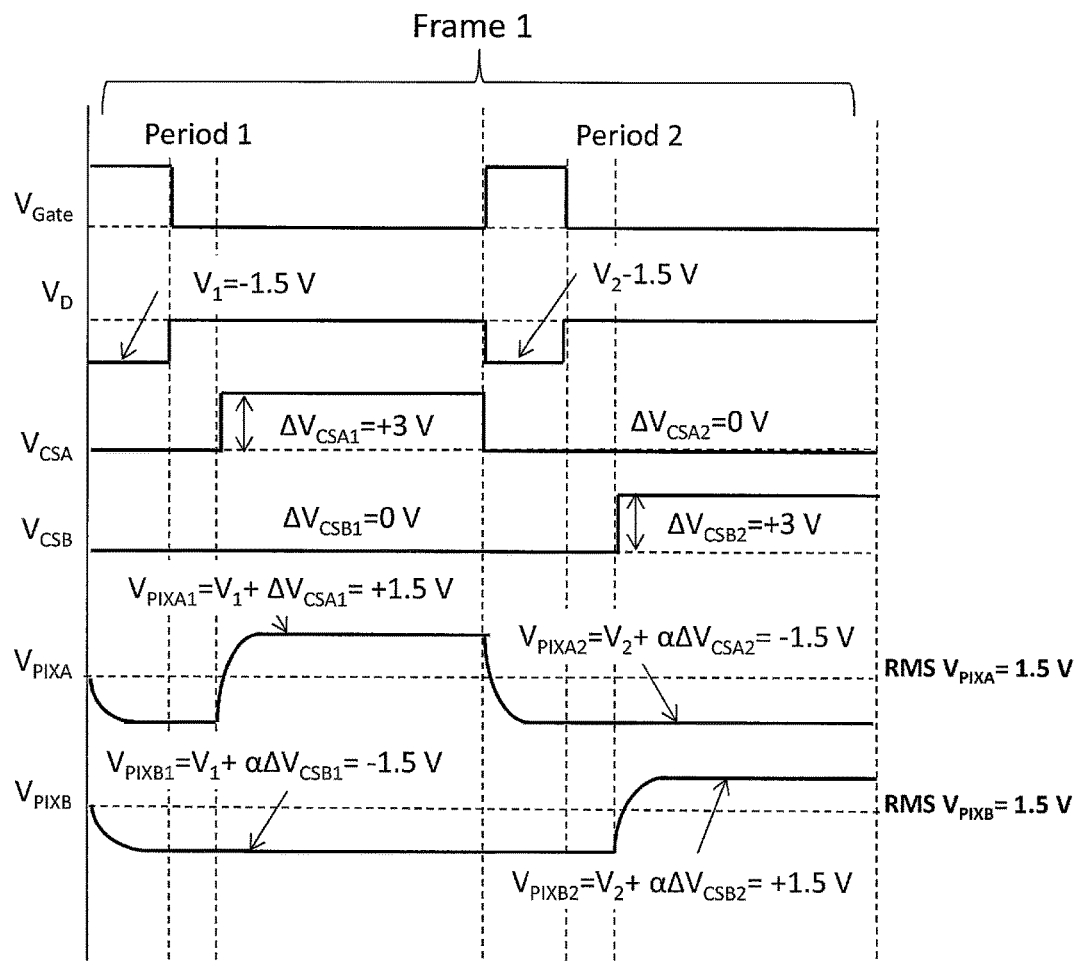
FIG. 10 is a timing diagram illustrating a means of driving a pixel of the type of FIG. 2 according to a further embodiment of this invention.

FIG. 10 illustrates how source data voltages of −1.5 V in both sub-frame periods, again with the same storage capacitor line voltage shifts as the previous examples, result in an rms voltage on both pixel regions of 1.5 $V_{rms}$, giving the inverse transmission of the example of FIG. 8, with pixel region A switched off, and pixel region B switched on.

Figure 11:
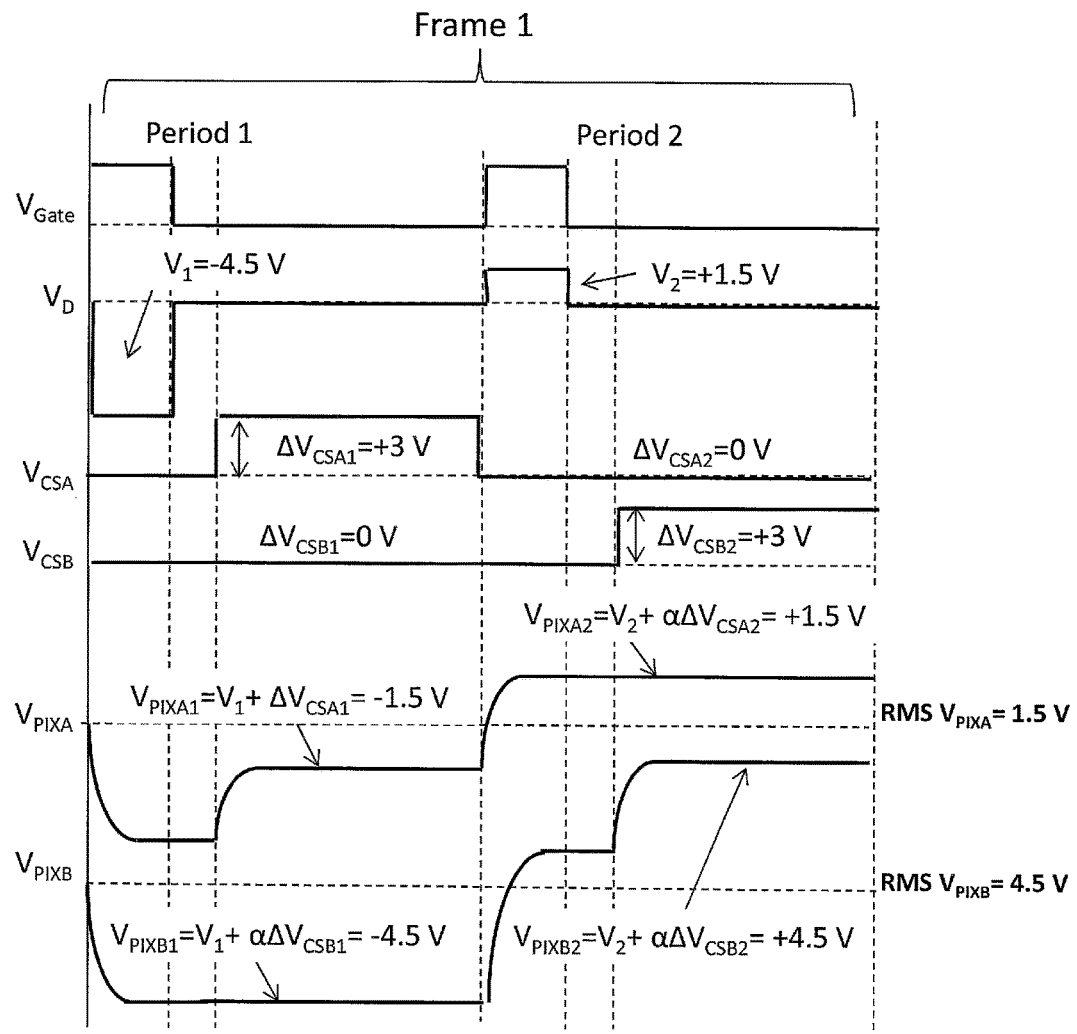
FIG. 11 is a timing diagram illustrating a means of driving a pixel of the type of FIG. 2 according to a further embodiment of this invention.

FIG. 11 illustrates how source data voltages of −4.5 V and +1.5V in the first and second sub-frame periods respectively, again with the same storage capacitor line voltage shifts as the previous examples, results in an rms voltage on pixel region A of 1.5 $V_{rms}$, and pixel region B of 4.5 $V_{rms}$, effectively switching both pixel regions off.

It can be seen from these examples, and the plot of the available simultaneous rms voltages which may be produced on each pixel region in FIG. 6, that in addition to these extreme cases, any intermediate transmission within this range may be produced from either pixel region by the application of suitable data voltages in the two sub-frame periods. The display of this embodiment is therefore capable of accurately reproducing image data which has two pixel data values for each display pixel separately addressable by the active matrix. The display resolution of the panel is thereby effectively doubled.

It should also be noted that in the examples of FIGS. 8 to 11, only the signal voltages for the at least two sub-frame periods required to accurately reproduce a single input frame of doubled resolution image data are shown, so the rms voltage resulting on the pixel electrodes has an overall d.c. component. In order to prevent damage to the LC material of the display, this d.c. component may be inverted in alternate frame periods simply by inverting the polarity of all the signal voltages shown in the figures. However, it is standard practice in the driving of LCD displays to also alternate the polarity of the pixel electrode voltages spatially in each frame, either row-wise, column-wise, or in a chequered pattern, so as to minimise flicker and crosstalk between pixels due to parasitic capacitance and leakage though the off-state TFTs. It can be seen from FIG. 4 that due to the sharing of the storage capacitor lines between pixel rows (e.g. Pixel 1 region B and Pixel 3 region B have a shared $V_{CSB}$ line, and this pattern of sharing continues such that the row of sub-pixels below pixel 3 region A and pixel 4 region A of the figure will share the $V_{CSA}$ line of those pixels etc.), it is not possible to invert the polarity of both the storage capacitor shift voltages $V_{CSA}$ and $V_{CSB}$ for alternate rows. It is also not possible to invert these signals for alternate columns, as the $V_{CS}$ lines are shared across all columns in a row. However, it is still possible to provide voltages on each pixel electrode region which are of the same rms voltage as the examples given, but opposite mean voltage and therefore inverse d.c. component, without altering the storage capacitor line signals. This may be achieved by providing for each pair of source data voltages $V_1$ and $V_2$ a complementary pair of alternative source data voltages $V_1'$ and $V_2'$. These alternative data voltages may be calculated for each combination of $V_1$ and $V_2$, based on the conditions that they must produce the same rms voltage on each pixel region as $V_1$ and $V_2$, with equal but opposite mean voltage over both sub-frame periods. These conditions may be expressed as:

$$\sqrt{\tfrac{1}{2}((V_1'+\Delta V_{CSA1})^2+(V_2'+\Delta V_{CSA2})^2)}= \\ \sqrt{\tfrac{1}{2}((V_1+\Delta V_{CSA1})^2+(V_2+\Delta V_{CSA2})^2)} \qquad \text{Eqn 3(a)}$$

And $$\tfrac{1}{2}((V_1'+\Delta V_{CSA1})+(V_2'+\Delta V_{CSA2}))=-\tfrac{1}{2}((V_1+\Delta V_{CSA1})+(V_2+\Delta V_{CSA2})) \qquad \text{Eqn 3(b)}$$

For the voltages on pixel region A. Eqn 3(a) yields the quadratic equation $$V_1'^2+2\Delta V_{CSA1}V_1'^2+V_2'^2+2\Delta V_{CSA2}V_2'^2+A=0 \qquad \text{Eqn 4(a)}$$

where $$A=V_1^2-2V_1\Delta V_{CSA1}-V_2^2-2V_2\Delta V_{CSA2} \qquad \text{Eqn 4(b)}$$

and Eqn 3(b) yields the linear equation $$V_2'=B-V_1' \qquad \text{Eqn 5(a)}$$

where $$B=-V_1-V_2-2\Delta V_{CSA1}-2\Delta V_{CSA2} \qquad \text{Eqn 5(b)}$$

substituting Eqn 5(a) into Eqn 4(a) yields a quadratic in $V_1'$ which may be solved using the general quadratic formula $$V_1' = \frac{-b \pm \sqrt{b^2 - 4ac}}{2a}. \qquad \text{Eqn 6(a)}$$

where $a=2$, $b=2\Delta V_{CSA1}-2B-\Delta V_{CSA2}$, and $c=B^2 - 2\Delta V_{CSA2}B+A$      Eqns 6(b, c, d)

This quadratic gives two possible values for $V_1'$, each of which may be returned into Eqn 5(a) to give two corresponding values for $V_2'$. Both of these pairs of values fulfil the conditions of Eqns 3(a) and (b) for pixel region A, but one of the pairs of values will also give the correct rms and inverted mean voltages for pixel region B.

It is therefore possible to implement any spatial d.c. inversion pattern on the pixels of the display simply by selecting whether $V_1$ and $V_2$ or $V_1'$ and $V_2'$ are applied as the data voltages for that pixel to achieve the combination of pixel region A and B brightness's required. It should be noted that the calculations above derive the corresponding data voltages, $V_1'$ and $V_2'$, for the case where the storage capacitor voltage signals are as given in the example. Different storage capacitor voltage signals may be used which still allow independent control of the two pixel regions, but for which the derivation of the corresponding data voltage pairs for equal rms but opposite mean voltage across the pixel differs, but may be achieved using the same principles. Also, the above calculation provides an exemplary means of deriving $V_1'$ and $V_2'$, these values may be calculated by any other means in order to achieve the same effect without departing from the scope of the invention.

In principle the voltages to be applied to regions of a pixel may be calculated afresh each time an input data value for a pixel is received. However, in some embodiments a display may be provided with a storage, for example a look-up table (LUT), for storing pre-calculated signal voltages corresponding to different input data values. One of the stored, pre-calculated signal voltages can be selected for a display refresh period based on a received input data value, thus avoiding the need to repeatedly calculate suitable signal voltages. For example, each pre-calculated signal voltage may be dependent on the desired luminance of each of the sub-pixels.

It can be seen from the above description that for each input frame of image data, two sub-frame period/display refresh periods are required, and the source data voltages $V_1$ and $V_2$ supplied to each pixel during the two sub-frame periods are determined according to the intended brightness of both pixel regions for that frame. According to this preferred embodiment then, if the display drive electronics contain an LUT or other storage for storing pre-calculated voltages the LUT or other storage may, for each pixel in the display consisting of multiple regions, maps the input image data for every combination of data values on all pixel regions to two pairs of pre-calculated output source data voltages, $V_1$ and $V_2$ and $V_1'$ and $V_2'$. One of these pairs is then selected for outputting to the intended pixel of the display according to whether a positive or negative d.c. component is intended for that pixel in that frame. An example LUT with key values only is shown in FIG. 12. Note in this figure, the key values have the same voltage output for both $V_1$ and $V_1'$ and $V_2$ and $V_2'$ for 3 of the given outputs—this is because these are special case values where the overall dc component of the $V_{PIX}$ voltage during the frame time is zero—as can be seen in FIGS. 8, 10 and 11.

In a supplementary embodiment, rather than outputting signal voltages, the LUT outputs digital image data values modified from the input image data values provided for each pixel region, these output data values being then subsequently mapped to the intended analogue data voltage by the digital to analogue converter standard to display driver electronics.

It can be seen from the above description that one feature of the principal embodiment is that both data voltages applied to each pixel in each display refresh period are now dependent on the image data value for both regions of that pixel. Rather than a straightforward input data value to signal voltage function, the control electronics must provide an expanded LUT with the number of entries being the square of the number of data values that may be applied to each pixel region. For a typical 8 bit display, then the LUT is required to have $256^2=65536$ entries. The memory requirement for a LUT of this size may be prohibitive for a mobile display device, but is unlikely to be a restriction for other applications such as a TV.

In a still further embodiment, if in the device of the intended application, data processing capability is more practical or economic to include in the display control electronics than memory, the data voltages for each sub-frame period may be calculated in real time, for example using the equations provided.

While the embodiment of FIG. 5 allows full independent control of the luminances of the two sub-pixels as indicated in FIG. 12, it has the potential disadvantage that certain combinations of luminances of the two sub-pixels require that the source voltages in successive display refresh periods have the same polarity as one another. For example, FIG. 12 indicates that the case where both sub-pixels have a data value of "0", require source voltages with negative polarity in the two display refresh periods of a frame (ie, $V_1=-1.5V$, $V_2=-1.5V$). Some available source drivers provide outputs that are alternatively positive and negative, and such source drivers cannot be used to implement the embodiment of FIG. 5. In a still further embodiment therefore, a two pixel region MPD type display is driven using four display refresh periods per frame. This may be advantageous, as it allows the polarity of the data voltage applied during each display refresh period to be restricted to alternately positive or negative voltages, while still allowing a useful voltage selection ratio. It also allows this restricted polarity to be alternated for alternate pixel columns, and/or for it to be inverted in sequential frames, while still allowing the same range of rms voltages to be produced on each pixel region over the full set of display refresh periods within each frame. This further embodiment is advantageous since the use of alternating source voltage polarity provides compatibility with commonly available source driver electronics.

It can be seen from FIG. 12 that for the two sub-frame scheme previously described, two pairs of pixel data voltages, to be supplied sequentially to a given pixel in the two sub-frame refresh periods, may be provided for each combination of intended resultant rms voltages on the two sub-pixel regions of the pixel, each pair producing the intended rms voltage combination but opposite mean dc voltage. This allows any dc polarity inversion pattern to be applied to the array of pixels of the display. Similarly in the current embodiment, four sets of four pixel data voltages are provided for each combination of resulting rms voltages on each pixel region, one for each dc polarity, and one for each pattern of restricted data voltage polarity of the four sub-frames (e.g. +, −, +, − for even columns and −, +, −, + for odd columns).

Figure 13:
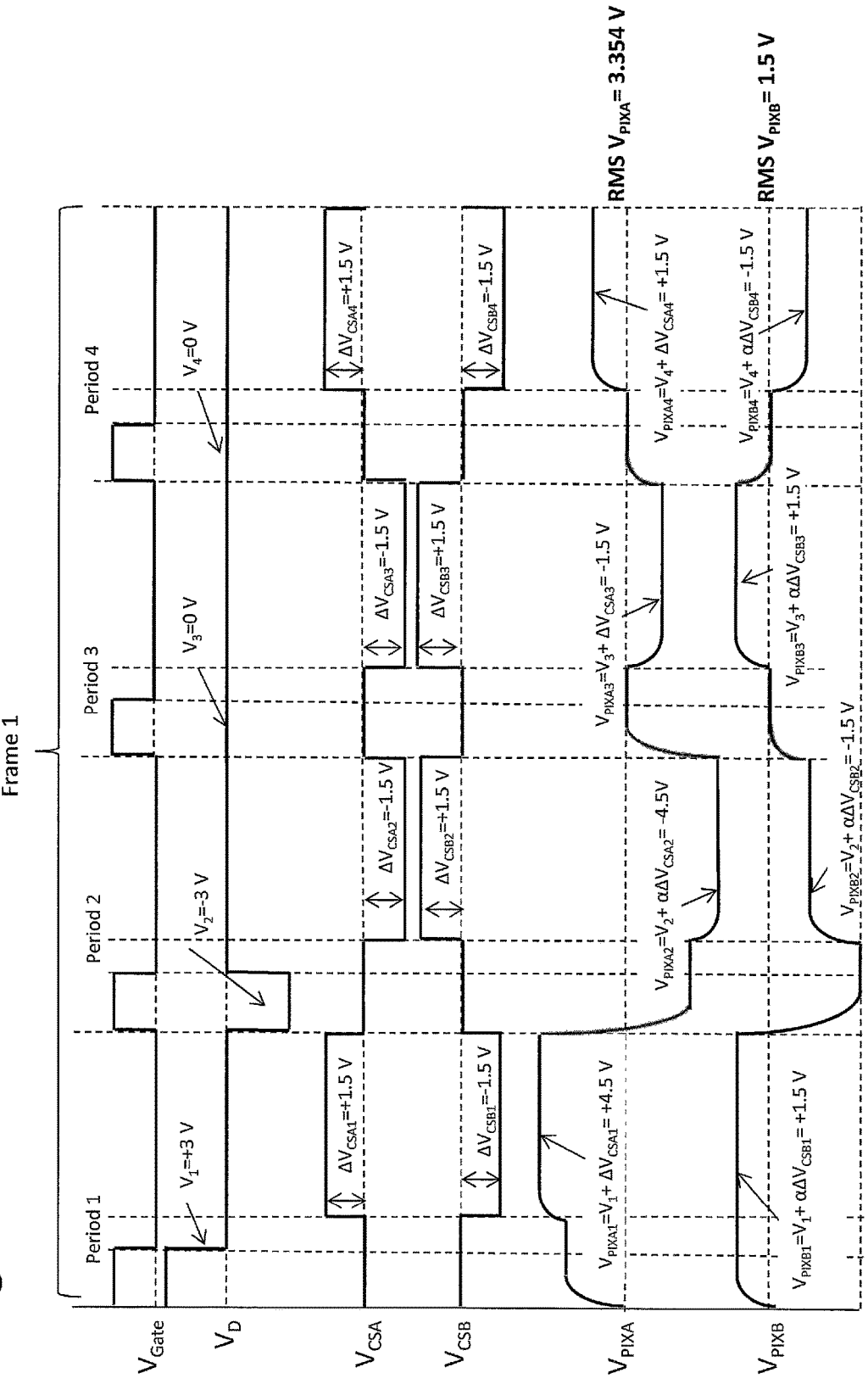
FIG. 13 is a timing diagram illustrating a means of driving a pixel of the type of FIG. 2 according to another embodiment of this invention.

FIG. 13 illustrates example waveforms for the gate, storage capacitor, and source data lines for the situation equivalent to that of FIG. 8, in which the resulting rms voltage on sub-pixel region A is required to be large, and the resulting rms voltage on sub-pixel region B is require to be small. FIG. 14 shows a table giving example data voltages to produce the result of FIG. 13 and the other three extreme rms combination cases also. It can be seen from these figures that, although independent control of the rms voltage on each sub-pixel region is still possible despite the data voltage polarity restriction (that is the constraint that output voltage must be alternatively positive and negative), using this 4 frame scheme, the maximum selection ratio is reduced from 3 to the square root of 5. (It will be seen that some of the entries in FIG. 14 include zero output voltages. For example, in the first entry in FIG. 14 each of $V_1$, $V_2$, $V_3$ and $V_4$ is zero—however this is regarded as a special case of alternating positive and negative output voltages, and all of the sets of $V_1$, $V_2$, $V_3$ and $V_4$ in FIG. 14 can be provided by a conventional source driver that is constrained to provide output voltages that must be alternatively positive and negative.) It should also be noted that the example in FIG. 14 are special cases having zero overall dc voltage, so the data voltages for the positive and negative dc target are the same. FIG. 15 shows some further examples in which a mid-valued rms voltage is required on at least one of the sub-pixel regions. In this more general case, data voltages of opposite polarity and/or altered order are required to produce equal but opposite dc components.

The fact that data voltage combinations exist which produce any combination of rms voltages on the two pixel regions within the defined maximum selection ratio range, and with any dc polarity, means a four sub-frame scheme as described may be applied with any dc polarity inversion pattern (e.g. dot or column inversion). In addition the data voltage polarity restriction on each column may be inverted temporally in alternate frames, as well as spatially in alternate columns, with no impact on the achievable rms and dc voltage combinations for each pixel. In addition, the polarity of the storage capacitor line signals may be inverted in alternate frames if required, again without impacting the rage of achievable rms voltage combinations or dc voltage patterns.

It should also be noted that using the 4 sub-frame scheme of this embodiment, there is significant degeneracy in the data voltage combinations for many resulting rms voltage combinations. While the data voltages given in FIGS. 13, 14 and 15 are exemplary, many other data voltage sequences could be used in the display to produce the required rms voltage combinations and dc polarity requirements of a given pixel, albeit with differing dc voltage magnitude. It may be that selecting the data voltage combination with the highest or lowest dc voltage magnitude or with maximum or minimum variation in the data voltages of the sequence may be preferable for the particular display type or implementation, based on display power consumption, optical or other requirements.

In a still further embodiment, each multiple region actively addressed pixel is driven in a duty addressing manner with the number of display refresh periods per frame increasing by one over the previous embodiments, i.e. for a two pixel region MPD type display, 3 display refresh periods are used. The data voltage applied to each pixel may then be calculated in a way to allow each data voltage applied during the frame period to be dependent on only one of the input image data values for the pixel regions, as described in "Displays, 14, 2, pp 74-85, 1993" by T. J Sheffer et al and U.S. Pat. No. 5,767,836 (In Focus Systems). The additional display refresh period is considered the addressing pulse for an additional "virtual" pixel region, and is a direct function of the other data voltages.

Figure 16:
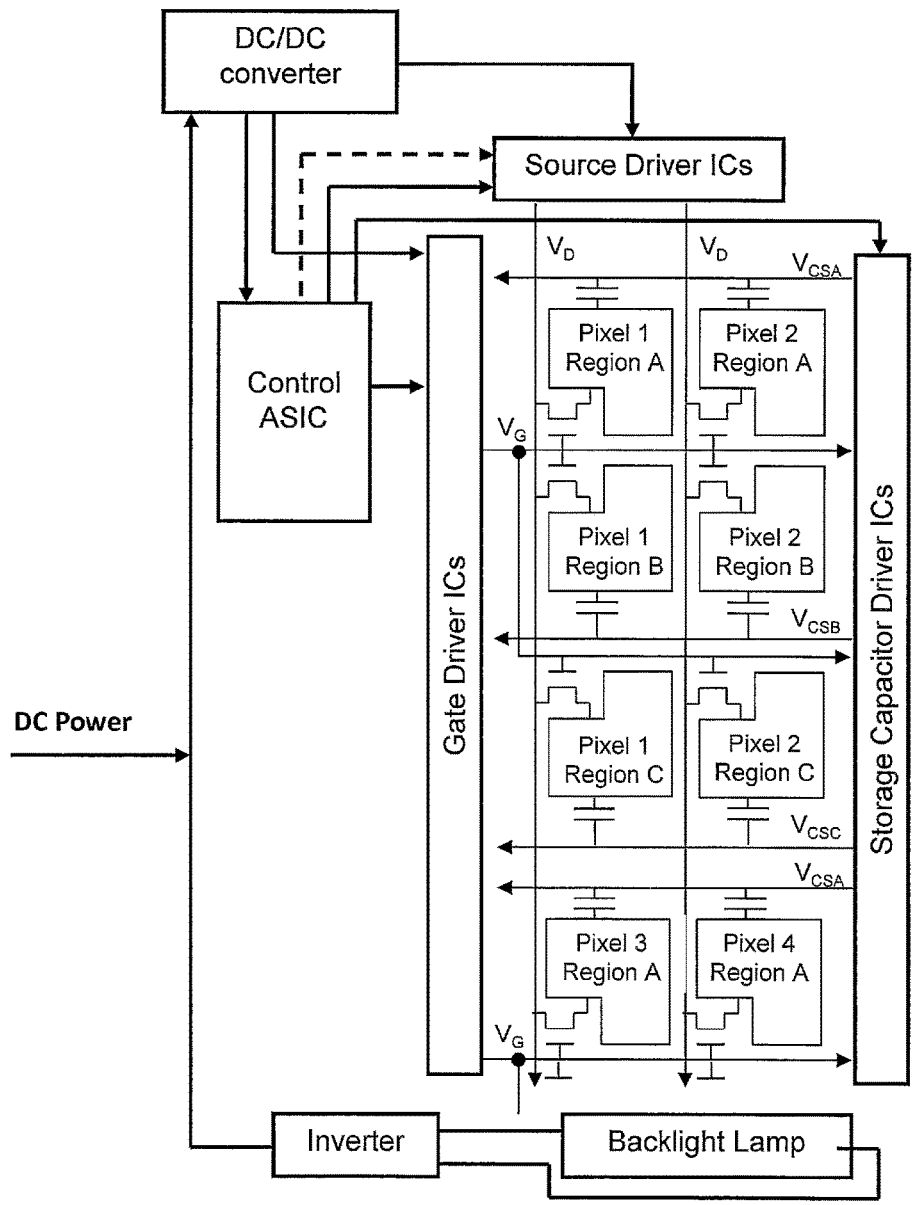
FIG. 16 is a schematic of an LCD control electronics arrangement according to an embodiment of this invention.

While the embodiments given above have been described with reference to an MPD type display with two pixel regions per actively addressed pixel, it should be noted that the methods described are equally applicable to displays with 3 or more regions per pixel, all addressed with the same data voltage but being associated with a separate storage capacitor line. This may allow further increase in the effective resolution of the display, but increases the effective number of rows in each separately passively addressed segment, and so reduced the available rms voltage selection ratio, as described by Nehring and Kmetz. An example schematic of such a scheme with three sub-pixel regions per pixel is given in FIG. 16.

Figure 17:
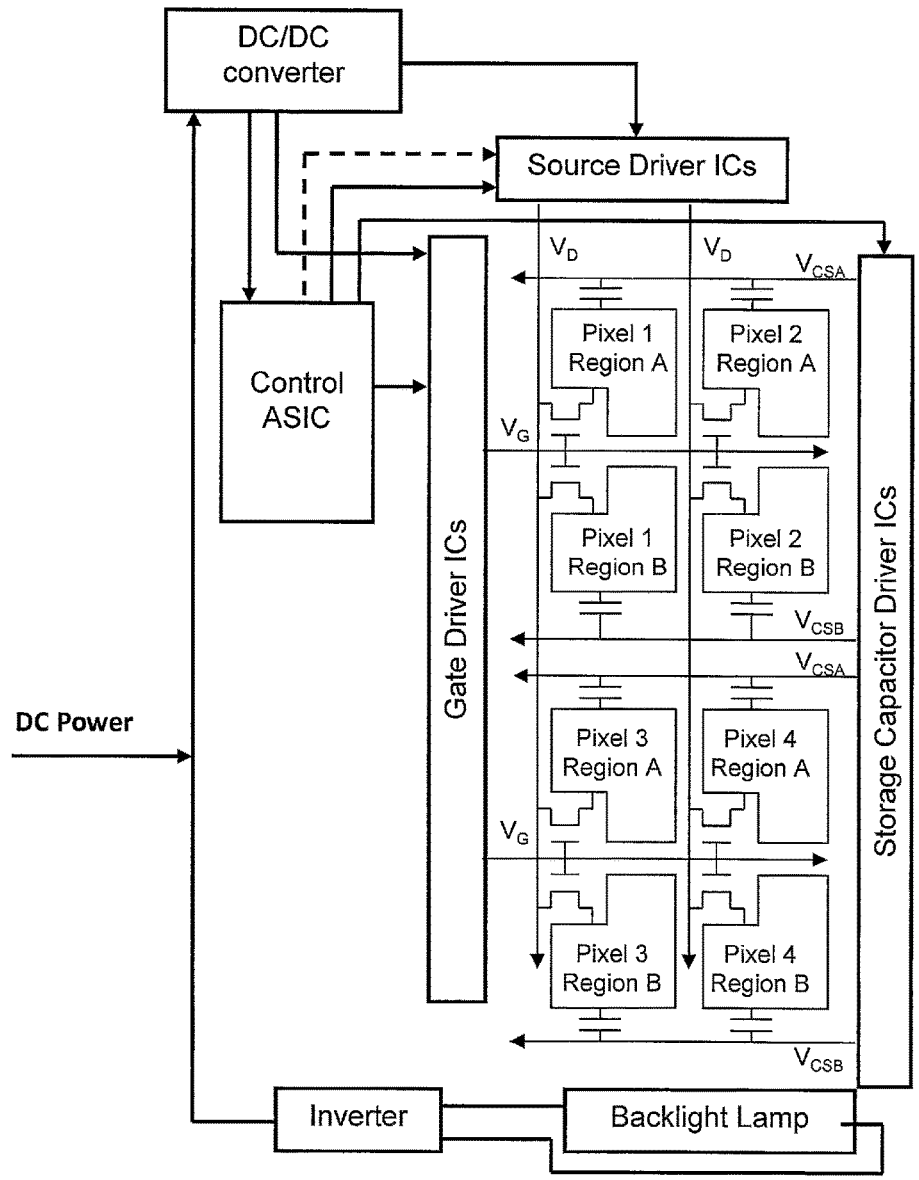
FIG. 17 is a schematic of an LCD control electronics arrangement according to an embodiment of this invention.

In a still further embodiment, rather than the storage capacitor line for the lower pixel region in one row of the display being shared with the upper pixel region of the row below, as illustrated in FIG. 4, two separate storage capacitor lines are provided per pixel row. This may be advantageous because, while the layout of the preferred embodiment provides a separate storage capacitor line per pixel region and therefore allows the rms based independent driving as described, the sharing of storage capacitor lines between neighbouring pixel rows prevents different $V_{CS}$ signals being applied to different rows. In effect all pixel rows must have the same two storage capacitor line signals. This prevents for example, the polarity of all the signals being applied to each pixel being inverted on a row by row basis. Providing completely separate storage capacitor lines for each row of pixels provides this increased freedom which may be beneficial for dc balancing the drive signals and preventing image data crosstalk between pixel rows. An example schematic of this embodiment is given in FIG. 17.

While the embodiments detailed above have been described with reference to the multiple regions of each pixel being arranged vertically, the methods described are equally applicable to MPD pixels in which the pixel regions are arranged horizontally adjacent to each other, and would therefore provide an increase in the horizontal resolution of the display. In fact, in a still further embodiment, the methods of these embodiments may be particularly advantageous when applied to an MPD type display in which the multiple regions of each pixel are arranged alternately horizontally and vertically adjacent. This allows a resolution increase to the display in both directions.

Alternatively in order to match the resolution increased provided by the previous embodiments in a first direction (eg the vertical direction, in the case of a display in which the multiple regions of each pixel are arranged vertically), the MPD type display may be constructed with twice as many pixels a second direction crossed with the first direction (eg with twice as many pixels in the horizontal direction, in the case of a display in which the multiple regions of each pixel are arranged vertically) as would be standard.

In a still further embodiment, the methods described are applied to an MPD type display with more than three colour pixels per compound white pixel. Such multiprimary displays have been developed principally for increasing the colour gamut of the display, but they also allow the effective resolution of the display to be increased by sub-pixel rendering of the input image data. Such methods are described in "Journal of the Society for Information Display, 19, 11, pp 771-780, 2011" by Yoshida et al. The horizontal resolution increase provided by these sub-pixel rendering methods may by combined with the vertical resolution increase provided by the present invention to provide an overall two dimension resolution doubling. For example, a standard highdefinition (1920×1080) pixel display of the 4 primary colour type may be driven with a known sub-pixel rendering method to obtain improved horizontal resolution and with a method of the invention to obtain improved vertical resolution to allow display of 3840×2160 (known as 4k2k) resolution images. Such a display may be particularly advantageous as 4k2k video content becomes more commonplace to allow the viewer the benefit of the increased image information without the need to invest in significantly more complicated display hardware. In the absence of video content of double the native pixel resolution of the display, a 4 or more primary colour display may still provide a superior viewing experience using these combined horizontal and vertical resolution increase methods with the use of an image resolution up scaling device, of which many are commonly available for up scaling of e.g. DVD video content for display on a full HD display. Up scaling devices will increasingly become available either from DVD (standard definition video) or from HD video to 4k2k video.

As described above, a display according to the present invention is operable in a first mode, in which the display is driven according to a drive method of the invention A display according to the invention may additionally be operable in a second mode in which it operates conventionally, that is in which the drive circuitry supplies capacitor line voltages that are constant over an entire frame.

In a still further embodiment, the MDP type display may be driven in the standard fashion (that is, in the second mode) solely in regions of each image frame which do not require the increased resolution capability. Typical video content will have substantial image regions with no sharp change in image data between neighbouring pixels. If no sharp change in image data occurs between the multiple regions of an entire pixel row, these regions may be detected as the data is input to the display and these rows may then be driven in the standard fashion, with the same data voltages and storage capacitor line signals in all the display refresh periods of the frame. This allows the wide-viewing angle improvement provided by the MPD pixel to be retained in these areas, as well as the full voltage range, in the case where the restricted 3:1 ratio of voltages on the two pixel region may reduce overall image contrast.

In a still further embodiment, the display may be driven in one of a number of modes dependent on the image data input to the display. In the case of the image data having pixel resolution matching the number of pixels in the display, the display may be driven with the methods of this invention effectively "off", i.e. with source and capacitor line signals according to the standard art as outlined in FIG. 3, in order to reduce the power consumption of the display. In the case of the image data matching the number of sub-pixel regions of the display, the methods of this invention may be used to fully display that information, or conversely this additional resolution information may be sacrificed, and single average luminance value calculated for the pixel so the display may still be driven with the methods of this invention off in order to save power, or allow a wide-view improvement to be applied as per the known MPD methods. Which of these modes is applied may be user selectable or selected automatically in dependence on the detected pixel resolution of the input data.

Figure 18:
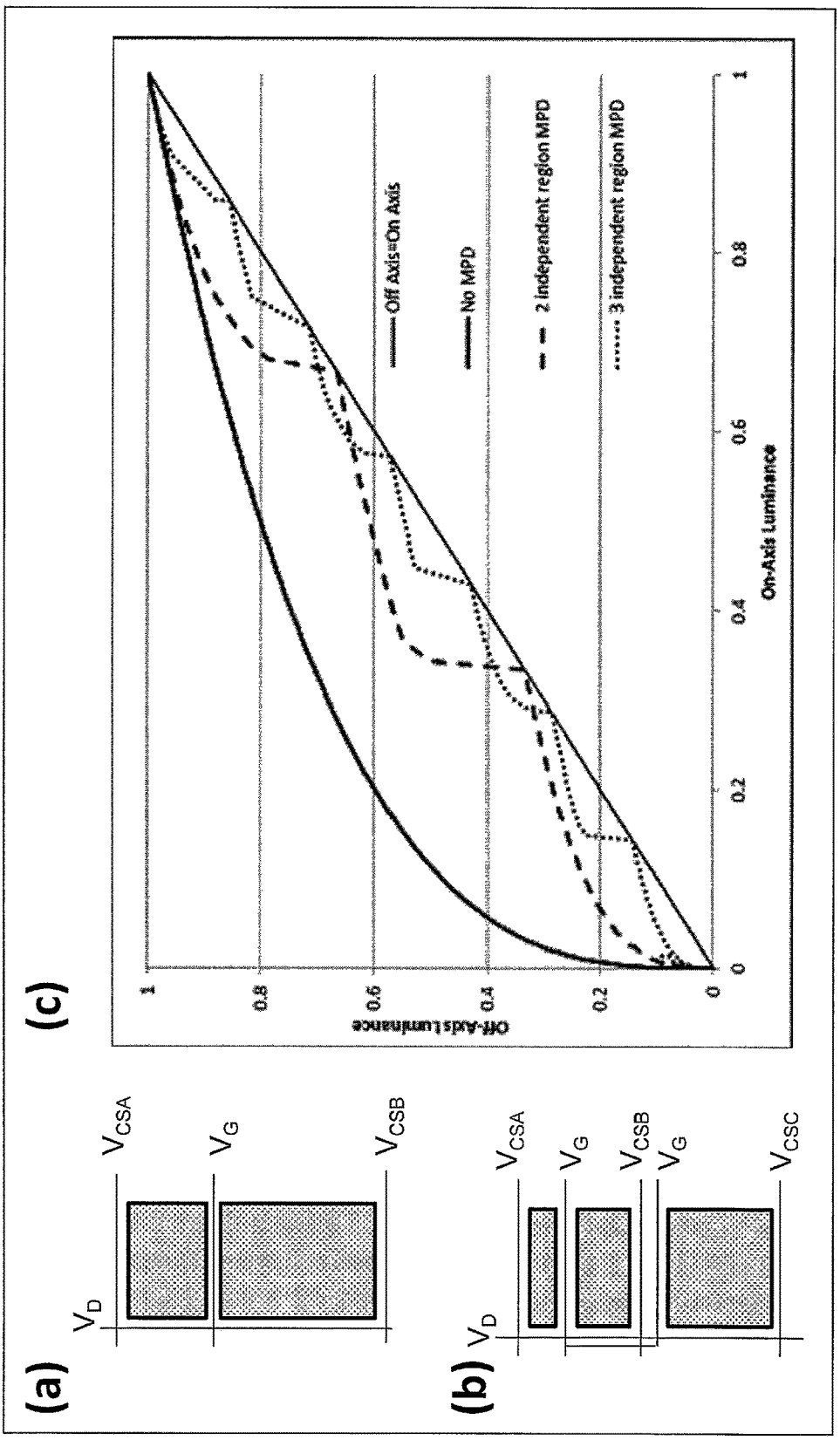
FIGS. 18(a) and (b) are illustrations of display pixels comprising multiple at least partially independently addressable sub-regions of different size, according to an embodiment of this invention.
FIG. 18(c) is a graph illustrating the improvement in off-axis luminance accuracy provided by pixels of this type.

In a still further embodiment of the invention, the sub-pixel regions of each pixel are not of equal size. One limitation of the standard MPD scheme for wide view improvement as detailed in FIG. 2 and U.S. Pat. No. 7,079,214 is that the order of brightness of the sub-pixel regions is always fixed for a given pixel, there is no advantage to having the sub-pixel regions different sized. However, as the methods of this invention allow a degree of independence in the relative brightness of the sub-pixel regions, an improved wide-view enhancement can be achieved if the sub-pixel regions of a pixel are not all identical in size. If, for example, the two sub-pixel regions of each pixel occupy respectively $\frac{1}{3}^{rd}$ and $\frac{2}{3}^{rds}$ of the transmissive area of the pixel, then the achievable wide view improvement is roughly equivalent to a three sub-pixel per pixel non-independent MPD scheme, as the smaller sub-pixel can be turned on to produce pixel luminances up to $\frac{1}{3}^{rd}$ of the maximum, then turned off and the larger sub-pixel used to produce luminances from $\frac{1}{3}^{rd}$ to $\frac{2}{3}^{rds}$ of the maximum, above which a combination of both sub-pixels may be used to produce the required luminance. The wide view improvement over a non-independent MPD scheme is further increased if 3 independent sub-pixel regions of respectively $\frac{1}{7}^{th}$, $\frac{2}{7}^{th}$ and $\frac{4}{7}^{ths}$ of the total pixel transmissive area are used, as the off-axis luminance characteristic may then match the result from a 7 region non-independent scheme. These improvements in off-axis luminance response for a typical vertical aligned nematic (VAN) mode LCD are illustrated in FIG. 18. In the invention of this embodiment, as the sub-pixel regions of each pixel are utilised for improved wide-view appearance rather than increased on-axis resolution, the drive circuitry of the invention will be arranged to receive just one pixel data value for each pixel region per frame. The drive circuitry will then determine the multiple source line signal voltages to be applied in each sub-frame refresh period in order to generate the rms voltages across each sub-pixel regions which produce the desired wide-view effect.

In a still further embodiment, a secondary input image or secondary input data value is used to determine the multiple source line signal voltages to be applied in each sub-frame refresh period, in order to allow a privacy effect of the type described in WO2009110128A1 and WO2011034209, which are hereby incorporated by reference. As with the previous embodiment, the independently controllable sub-pixel regions of each pixel of this invention allow an improved range of off-axis luminance values for any fixed on-axis luminance, which in this instance allows an increased privacy strength effect. To provide a privacy effect the display drive circuitry is adapted to, in response to image data that specifies a data value for a complete pixel, to output signal voltages so as to control the luminance to an on-axis viewer of each sub-pixel according to the overall luminance of the pixel defined by the input data, but to divide the overall luminance between the sub-pixels of a pixel so as to control the off-axis luminance of the whole pixel according to a desired off-axis luminance of that pixel. The desired off-axis luminance of each pixel may for example be determined by a secondary input data value, may be determined to be as close as possible to, or proportionate to, the intended on-axis luminance specified by the input data value for the pixel, or may be determined to be a fixed value that is independent of the input data value for the pixel.

It will be appreciated that each of the above-described embodiments are not limited to operation using the particular liquid crystal configurations described. Each embodiment of the present invention can be used with any of the following types of liquid crystal display: Twisted Nematic (TN); Super Twisted Nematic (STN); In Plane Switching (IPS), Fringe Field Switching (FFS and AFFS); Vertically Aligned Nematic (VAN); Twisted Vertically Aligned Nematic (TVAN); Multidomain Vertical Aligned (MVA); and Continuous Pinwheel Aligned (CPA). Other suitable liquid crystal modes would be readily available to those skilled in the art.

(SUPPLEMENTAL NOTES)

A first aspect of the invention provides an active matrix LCD display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines. The display has drive circuitry for, in a first mode, in response to input data for a pixel for a frame of image data, supplying a plurality of signal voltages for the frame to the source line of the pixel and supplying a plurality of capacitor line voltages, each of the capacitor line voltages being supplied to a respective storage capacitor address line of the pixel. The drive means is adapted to supply the capacitor line voltages such that the relationship between at least a first one of the capacitor line voltages and a second one of the capacitor line voltages supplied in a first display refresh period of the frame is different to the relationship between the first of the capacitor line voltages and the second of the capacitor line voltages supplied in a subsequent display refresh period of the frame.

In a display of the invention the voltage applied to a source line is not constant over a frame, but may take different values in different display refresh periods of a frame. While this could be considered as supplying a single signal voltage waveform in a frame with the signal voltage waveform having a varying magnitude, for clarity of description this application will refer to two (or more) signal voltages being supplied in a frame, one signal voltage being supplied in each display refresh period.

Supplying the capacitor line voltages such that the relationship between two of the capacitor line voltages varies between one display refresh period of the frame and a successive display refresh period overcomes the limitation described with reference to U.S. Pat. No. 7,079,214 above, that the relative transmittance of the sub-pixels is fixed over a frame, and provides increased resolution.

The term "frame" as used denotes a display period corresponding to a frame of the input image supplied to the display. In a conventional display driven as shown in FIG. 3 the display is refreshed just once in a frame, but in a display of the invention the display is refreshed two or more times in a frame.

In an embodiment in which there are three or more display refresh periods in a frame, it is not necessary for the "first" display refresh period and the "subsequent" display refresh period to be consecutive display refresh periods—the relationship between the first one of the capacitor line voltages and the second one of the capacitor line voltages may stay the same for two consecutive display refresh period of a frame (as shown for example for the second and third display refresh periods in FIG. 13 below).

The drive means may be adapted to supply the signal voltage and the first one of the capacitor line voltages in the first and second display refresh periods of the frame such that the root-mean-square (RMS) voltage applied over the frame across a first of the sub-pixels is controllable at least partially independently of the RMS voltage applied over the frame across a second of the sub-pixels.

A second aspect of the invention provides an active matrix LCD display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines. The display has drive means for, in a first mode, in response to input data for a pixel for a frame of image data, supplying a plurality of signal voltages for the frame to the source line of the pixel, and supplying a plurality of capacitor line voltages, each of the capacitor line voltages being supplied to a respective storage capacitor address line of the pixel. The drive means is adapted to supply the signal voltage and the capacitor line voltages such that the root-mean-square (RMS) voltage applied over the frame across a first of the sub-pixels is controllable at least partially independently of the RMS voltage applied over the frame across a second of the sub-pixels.

The drive means may supply a first signal voltage to the source line of the pixel in a first display refresh period of the frame and may supply a second signal voltage different from the first signal voltage in the second display refresh period of the frame.

The drive means may supply the signal voltage and the capacitor line voltages in the first and second display refresh periods of the frame such that the RMS voltage applied across the first sub-pixel over the frame is controllable between one third of and three times the RMS voltage applied over the frame across the second sub-pixel. In many displays, changing a pixel from minimally transmissive to maximally transmissive requires changing the applied voltage by a factor of approximately 3. Arranging that the RMS voltage applied across the first sub-pixel over the frame is controllable between one third of and three times the RMS voltage applied over the frame across the second sub-pixel therefore allows each sub-pixel to be put in its minimally transmissive state or maximally transmissive state, or in any intermediate state, regardless of the state of the other sub-pixel.

First and second display refresh periods may be defined in a frame.

Alternatively more than two display refresh periods may be defined in a frame—for example, first to fourth display refresh periods may be defined in a frame. This may be advantageous, as it allows the polarity of the data voltage applied during each display refresh period to be restricted to alternately positive or negative voltages, while still allowing a useful voltage selection ratio. It also allows this restricted polarity to be alternated for alternate pixel columns, and/or for it to be inverted in sequential frames, while still allowing the same range of rms voltages to be produced on each pixel region over the full set of display refresh periods within each frame. This is advantageous since the use of alternating source voltage polarity provides compatibility with commonly available source driver electronics.

The drive means may supply the signal voltage and the capacitor line voltages such that, for each sub-pixel of the plurality of sub-pixels, the net voltage applied across the sub-pixel in a group of N successive frames is of opposite polarity and substantially equal in magnitude to the net voltage applied across the sub-pixel in an immediately succeeding group of N frames. It is known that some types of display media (for example liquid crystals) will degrade if addressed using display voltages that have a net DC component over time. This embodiment ensures that, over 2N consecutive frames (where N=1, 2, 3 etc), there is no net DC voltage across the display medium and hence prevents electrolytic degradation of the display medium.

The input data for a pixel for a frame may comprise a plurality of input data values, each of the input data values defining a desired luminance of a respective sub-pixel of the pixel.

Alternatively, the input data for a pixel for a frame may define a desired overall luminance for the pixel (and hence the input data for a pixel for a frame may comprise a single data value). (It should be noted that "pixel" as used herein relates to a single colour pixel. In the case of a composite white pixel formed of 3 pixels, three data values are required to define the output of the composite white pixel.)

Where the input data for a pixel for a frame comprises a plurality of input data values, the drive means may supply the signal voltages for a pixel for a frame in dependence on the plurality of input data values.

Where the input data for a pixel for a frame comprises a plurality of input data values, the drive means may supply the signal voltages and the capacitor line voltages for a pixel for a frame in dependence on the plurality of input data values.

The drive means may determine, for a pixel for a frame, at least two sets of n signal voltages, where n is the number of display refresh periods in a frame, such that each set of signal voltages provides a desired RMS voltage for the pixel over the frame, and such that the first set of signal voltages provides an overall voltage across the pixel over the frame that is of substantially equal magnitude but opposite polarity to the overall voltage produced across the pixel over the frame by the second set of signal voltages. One of the first and second sets of signal voltages can then be selected for a particular display refresh period in dependence upon a desired polarity of the voltage across the pixel in that display refresh period. In this embodiment, specifying that two sets of n signal voltages provide overall voltages "of substantially equal magnitude" means that the two sets of signal voltages result in pixel luminances that are perceived as similar by a viewer of the display.

Alternatively, the display may comprise a storage for storing pre-calculated signal voltages, the drive means being adapted to select, for a display refresh period, one of the pre-calculated signal voltages for supply to the signal line of the pixel. Storing pre-calculated signal values avoids the need to calculate suitable signals voltages for each display refresh period.

Each pre-calculated signal voltage may be dependent on the desired luminance of each of the sub-pixels (for the overall frame). In some cases, the signal voltage to be applied to a sub-pixel in a display refresh period is not determined solely by the intended luminance of that sub-pixel in that display refresh period—there are cases where, in order to determine the signal voltages to apply to a sub-pixel in each of the display refresh periods, it is necessary to know the intended luminance of all the sub-pixels for the frame.

The storage may store, in use, first and second sets of pre-calculated signal voltages for each combination of desired luminance values of the sub-pixels of a pixel, and the drive circuitry may select, for a display refresh period, one of the first and second sets of pre-calculated signal voltages in dependence upon a desired polarity of the voltage applied across the pixel in that display refresh period. This provides the advantages associated with storing pre-calculated signal values, while still allowing a desired polarity of voltage in a display refresh period since one of the first and second sets of stored signal voltages can be selected for a particular display refresh period in dependence upon a desired polarity of the voltage across the pixel in that display refresh period.

The storage may comprise a look-up table.

At least one pixel, and preferably all pixels, of the display may comprise two sub-pixels.

Alternatively at least one pixel, and preferably all pixels, of the display may comprise three or more sub-pixels, for example may comprise four sub-pixels.

The drive circuitry may be arranged to supply the signal voltages such that the polarity of a signal voltage supplied in a display refresh period is opposite to the polarity of a signal voltage supplied in an immediately preceding display refresh period. Many common source drivers are constrained to provide output voltages that are alternatively positive and negative, and this embodiment may be implemented with such source drivers.

The display may have composite white pixels comprised of at least four pixels of different colours, each colour pixel comprising a plurality of sub-pixels spaced from one another along a first direction, the colour pixels being arranged in order in each composite white pixel to create a repeating pattern of colour stripes extending along the first direction thereby to increase the effective resolution in a direction crossed with the first direction, and in the first mode the drive circuitry may supply the signal voltages and the capacitor line voltages so as to increase the effective resolution in a direction parallel to the source lines. As explained below, the present invention can provide increased resolution Displays having more than three colour pixels in a composite white pixel (for example red, green, blue and yellow pixels in a composite white pixel) are known, and it is also known that the resolution of such a display may be increased in a horizontal direction (that is, in a direction cross with the source lines of the display) by sub-pixel rendering of the input image data. The invention may be used to increase the resolution of such a display in the vertical direction (that is, in a direction parallel to the source lines of the display)—so that increased resolution in both horizontal and vertical directions may be obtained when this embodiment is implemented together with sub-pixel rendering of the input image data.

A pixel may comprise sub-pixels of at least two different sizes to one another, and if a pixel has three or more sub-pixels it is possible for all sub-pixels of a pixel to be different sizes from one another. An improved wide-view enhancement can be achieved if the sub-pixel regions of a pixel are not all identical in size.

For example, if a pixel comprises two sub-pixels it may comprise a first sub-pixel occupying ⅓ of the pixel area, and a second sub-pixel occupying ⅔ of the pixel area. If, for example, the two sub-pixel regions of each pixel occupy respectively $\frac{1}{3}^{rd}$ and $\frac{2}{3}^{rds}$ of the transmissive area of the pixel, then the achievable wide view improvement is roughly equivalent to a three sub-pixel per pixel non-independent MPD scheme, as the smaller sub-pixel can be turned on to produce pixel luminances up to ⅓rd of the maximum, then turned off and the larger sub-pixel used to produce luminances from $\frac{1}{3}^{rd}$ to $\frac{2}{3}^{rds}$ of the maximum, above which a combination of both sub-pixels may be used to produce the required luminance.

As a further example, if a pixel comprises three sub-pixels it may comprise a first sub-pixel occupying ⅐ of the pixel area, a second sub-pixel occupying 2/7 of the pixel area, and a third sub-pixel occupying 4/7 of the pixel area. This provides a further improvement in wide view enhancement over a non-independent MPD scheme, as the off-axis luminance characteristic may then match the result from a 7 region non-independent scheme.

The display drive circuitry may be adapted, in response to image data that specifies a data value for a complete pixel only, to output signal voltages so as to control the luminance to an on-axis viewer on each sub-pixel according to the overall luminance of the pixel defined by the input data, but divides the overall luminance between the sub-pixels so as to control the off-axis luminance of the whole pixel according to a desired off-axis luminance of that pixel. This allows, for example, the display to be operated in a narrow-view, or "private", display mode in which off-axis luminance is substantially lower than on-axis luminance or in a wide-view, or "public", display mode in which off-axis luminance is generally comparable than on-axis luminance.

The desired off-axis luminance of each pixel may be determined by a secondary input data value. This is convenient way of selecting between a narrow-view display mode and a wide-view display mode.

Alternatively the desired off-axis luminance of each pixel may be determined to be as close as possible to, or proportionate to, the intended on-axis luminance specified by the input data value for the pixel.

Alternatively the desired off-axis luminance of each pixel may be determined to be a fixed value that is independent of the input data value for the pixel.

A display of the first or second aspect may additionally be operable in a second mode, in which it operates conventionally, that is in which the drive circuitry supplies capacitor line voltages that are constant over an entire frame. In such an embodiment, if the image is such that the invention will not provide a significant improvement in display quality, the processing of the invention may be disabled so that display operates as a conventional display. For example, the display may be arrange to select either the first mode or the second mode dependent on the input data—for example the display may determine a characteristic (such as the format) of the image defined by the input data and select either the first mode or the second mode dependent on the determined characteristic. Alternatively, the display may receive a separate control input signal that determines whether the device operates in the first mode or in the second mode.

Additionally, it may be desired to apply the invention over only part of an image, and this can be achieved by arranging for the display to operate in the first mode for some pixels of the image to be displayed and to operate in the second mode for other pixels of the image to be displayed.

A third aspect of the invention provides a method of driving an active matrix LCD display, the display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines, the method comprising, in a first mode:

in response to input data for a pixel for a frame of image data, supplying a plurality of signal voltages for the frame to the source line of the pixel and supplying a plurality of capacitor line voltages, each of the capacitor line voltages being supplied to a respective storage capacitor address line of the pixel;

wherein the method comprises supply the capacitor line voltages such that the relationship between at least a first one of the capacitor line voltages and a second one of the capacitor line voltages supplied in a first display refresh period of the frame is different to the relationship between the first of the capacitor line voltages and the second of the capacitor line voltages supplied in a subsequent display refresh period of the frame.

A fourth aspect of the invention provides a method of driving an active matrix LCD display, the display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines, the method comprising, in a first mode: in response to input data for a pixel for a frame of image data, supplying a plurality of signal voltages for the frame to the source line of the pixel and supplying a plurality of capacitor line voltages, each of the capacitor line voltages being supplied to a respective storage capacitor address line of the pixel; wherein the method comprises supplying the signal voltage and the capacitor line voltages such that the root-mean-square (RMS) voltage applied over the frame across a first of the sub-pixels is controllable at least partially independently of the RMS voltage applied over the frame across a second of the sub-pixels.

A method of the invention may provide any feature or combination of features defined above for a display of the first or second aspect.

INDUSTRIAL APPLICABILITY

The invention described herein may be applicable to LCD displays in which either the input image data is of a higher pixel resolution than the native resolution of the display, or in which an increase in the perceived resolution of the input image content, provided by up scaling the input data, is desirable.

The invention claimed is:

1. An active matrix LCD display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines;

the display having drive circuitry for, in a first mode, in response to input data for a pixel for a frame of image data, supplying a plurality of signal voltages for the frame to the source line of the pixel and supplying a plurality of capacitor line voltages, each of the capacitor line voltages being supplied to a respective storage capacitor address line of the pixel;

wherein the drive circuitry is adapted to supply the capacitor line voltages such that the relationship between at least a first one of the capacitor line voltages and a second one of the capacitor line voltages supplied in a first display refresh period of the frame is different to the relationship between the first of the capacitor line voltages and the second of the capacitor line voltages supplied in a subsequent display refresh period of the frame;

wherein the drive circuitry is adapted to supply the signal voltages and the first one of the capacitor line voltages in the first and second display refresh periods of the frame such that the root-mean-square (RMS) voltage applied over the frame across a first of the sub-pixels is controllable at least partially independently of the RMS voltage applied over the frame across a second of the sub-pixels; and wherein a relationship between the RMS voltages across the first and second sub-pixels is independent between pixels in a row addressed by common capacitor lines.

2. An active matrix LCD display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines;

the display having drive circuitry for, in a first mode, in response to input data for a pixel for a frame of image data, supplying a plurality of signal voltages for the frame to the source line of the pixel, and supplying a plurality of capacitor line voltages, each of the capacitor line voltages being supplied to a respective storage capacitor address line of the pixel;

wherein the drive circuitry is adapted to supply the signal voltages and the capacitor line voltages such that the root-mean-square (RMS) voltage applied over the frame across a first of the sub-pixels is controllable at least partially independently of the RMS voltage applied over the frame across a second of the sub-pixels; and wherein a relationship between the RMS voltages across the first and second sub-pixels is independent between pixels in a row addressed by common capacitor lines.

3. A display as claimed in claim 1 wherein the drive circuitry supplies, in use, a first signal voltage to the source line of the pixel in a first display refresh period of the frame and supplies, in use, a second signal voltage different from the first signal voltage in the second display refresh period of the frame.

4. A display as claimed in claim 1, wherein the drive circuitry is adapted to supply the signal voltages and the capacitor line voltages in the first and second display refresh periods of the frame such that the RMS voltage applied across the first sub-pixel over the frame is controllable between one third of and three times the RMS voltage applied over the frame across the second sub-pixel.

5. A display as claimed in claim 1 wherein first and second display refresh periods are defined in a frame.

6. A display as claimed in claim 1 wherein first to fourth display refresh periods are defined in a frame.

7. A display as claimed in claim 1 wherein the drive circuitry is adapted to supply the signal voltages and the capacitor line voltages such that, for each sub-pixel of the plurality of sub-pixels, the net voltage applied across the sub-pixel in a group of N successive frames is of opposite polarity and substantially equal in magnitude to the net voltage applied across the sub-pixel in an immediately succeeding group of N successive frames.

8. A display as claimed in claim 1 wherein the input data for a pixel for a frame comprise a plurality of input data values, each of the input data values defining a desired luminance of a respective sub-pixel of the pixel.

9. A display as claimed in claim 8 wherein the drive circuitry is adapted to supply the signal voltages for a pixel for a frame in dependence on the plurality of input data values.

10. A display as claimed in claim 1 wherein the drive circuitry is adapted to: determine, for a pixel for a frame, at least two sets of n signal voltages, where n is the number of display refresh periods in a frame, such that each set of signal voltages provides a desired RMS voltage for the pixel over the frame, and such that the first set of signal voltages provides an overall voltage across the pixel over the frame that is of substantially equal magnitude and opposite polarity to the overall voltage produced across the pixel over the frame by the second set of signal voltages.

11. A display as claimed in claim 1 and comprising a storage for storing pre-calculated signal voltages, the drive circuitry being adapted to select, for a display refresh period, one of the pre-calculated signal voltages for supply to the signal line of the pixel.

12. A display as claimed in claim 1 wherein the input data for a pixel for a frame comprise a plurality of input data values, each of the input data values defining a desired luminance of a respective sub-pixel of the pixel;

the display comprises a storage for storing pre-calculated signal voltages, the drive circuitry being adapted to select, for a display refresh period, one of the pre-calculated signal voltages for supply to the signal line of the pixel; and each pre-calculated signal voltage is dependent on the desired luminance of each of the sub-pixels.

13. A display as claimed in claim 11 wherein the storage stores, in use, first and second sets of pre-calculated signal voltages for each combination of desired luminance values of the sub-pixels of a pixel, and wherein the drive circuitry selects, for a display refresh period, one of the first and second sets of pre-calculated signal voltages in dependence upon a desired polarity of the voltage applied across the pixel in that display refresh period.

14. A display as claimed in claim 1 wherein at least one pixel of the display comprises two sub-pixels, or wherein at least one pixel of the display comprises three or more sub-pixels.

15. A display as claimed in claim 6, wherein the drive circuitry is arranged to supply the signal voltages such that the polarity of a signal voltage supplied in a display refresh period is opposite to the polarity of a signal voltage supplied in an immediately preceding display refresh period.

16. A display as claimed in claim 1 and having composite white pixels comprised of at least four pixels of different colours, each colour pixel comprising a plurality of sub-pixels spaced from one another along a first direction, wherein in the first mode the drive circuitry supplies the signal voltages and the capacitor line voltages so as to increase the effective resolution in a direction parallel to the first direction; and wherein the colour pixels are arranged in order in each composite white pixel to create a repeating pattern of colour stripes extending along the first direction thereby to increase the effective resolution in a direction crossed with the first direction.

17. A display as claimed in claim 1 in which a pixel comprises sub-pixels of at least two different sizes to one another.

18. A display as claimed in claim 17 wherein a pixel comprises a first sub-pixel occupying ⅓ of the pixel area, and a second sub-pixel occupying ⅔ of the pixel area; or wherein a pixel comprises a first sub-pixel occupying ⅐ of the pixel area, a second sub-pixel occupying 2/7 of the pixel area, and a third sub-pixel occupying 4/7 of the pixel area.

19. A method of driving an active matrix LCD display, the display having a plurality of source lines, a plurality of gate lines crossed with the source lines and a plurality of storage capacitor address lines, independently addressable pixels being provided at intersections of the source and gate lines, a pixel comprising a plurality of sub-pixels and each sub-pixel of a pixel being associated with a respective one of the storage capacitor address lines, the method comprising, in a first mode:

in response to input data for a pixel for a frame of image data, supplying a plurality of signal voltages for the frame to the source line of the pixel and supplying a plurality of capacitor line voltages, each of the capacitor line voltages being supplied to a respective storage capacitor address line of the pixel;

wherein the method comprises supplying the capacitor line voltages such that the relationship between at least a first one of the capacitor line voltages and a second one of the capacitor line voltages supplied in a first display refresh period of the frame is different to the relationship between the first of the capacitor line voltages and the second of the capacitor line voltages supplied in a subsequent display refresh period of the frame; and supplying the signal voltages and the first one of the capacitor line voltages in the first and second display refresh periods of the frame such that the root-mean-square (RMS) voltage applied over the frame across a first of the sub-pixels is controllable at least partially independently of the RMS voltage applied over the frame across a second of the sub-pixels;

wherein a relationship between the RMS voltages across the first and second sub-pixels is independent between pixels in a row addressed by common capacitor lines.

* * * * *